United States Patent
Franiak et al.

(10) Patent No.: US 10,137,819 B2
(45) Date of Patent: Nov. 27, 2018

(54) HOIST ASSEMBLY

(71) Applicant: Wastequip, LLC, Charlotte, NC (US)

(72) Inventors: Nicholas S. Franiak, Francesville, IN (US); Nathan L. Martindale, Star City, IN (US)

(73) Assignee: Wastequip, LLC, Charlotte, NC (US)

( * ) Notice: Subject to any disclaimer, the term of this patent is extended or adjusted under 35 U.S.C. 154(b) by 746 days.

(21) Appl. No.: 14/623,132

(22) Filed: Feb. 16, 2015

(65) Prior Publication Data

US 2016/0236607 A1 Aug. 18, 2016

(51) Int. Cl.
*B60P 1/64* (2006.01)
*B66C 23/00* (2006.01)

(52) U.S. Cl.
CPC ............ *B60P 1/6454* (2013.01); *B66C 23/54* (2013.01)

(58) Field of Classification Search
CPC ........ B60P 1/6454; B66C 23/54; B65H 57/14
USPC ......................................................... 254/394
See application file for complete search history.

(56) References Cited

U.S. PATENT DOCUMENTS

| | | | | |
|---|---|---|---|---|
| 3,122,341 A * | 2/1964 | Le Bus, Sr. | ........ | B65H 54/2851 242/157.1 |
| 3,376,987 A * | 4/1968 | Lohse | ................. | A01D 87/126 414/458 |
| 4,455,118 A * | 6/1984 | Scharf | ................. | B60P 1/6454 254/386 |
| 4,846,446 A * | 7/1989 | Peppel | ................... | B63B 21/00 254/277 |
| 6,126,023 A * | 10/2000 | Durrant-Whyte | ....... | B66C 13/06 212/274 |
| 6,354,787 B1 * | 3/2002 | O'Daniel | ............. | B60P 1/6454 414/494 |
| 7,192,239 B2 * | 3/2007 | Marmur | ................ | B60P 1/6427 414/475 |
| 8,684,336 B1 * | 4/2014 | Akerman | ................ | E21B 17/07 254/337 |
| 9,004,842 B2 * | 4/2015 | Downing | ............. | B60P 1/6454 414/494 |
| 9,855,883 B2 * | 1/2018 | Martindale | ............... | B60P 7/13 |
| 2009/0148262 A1 * | 6/2009 | Shirvanian | ............ | B60P 1/6454 414/471 |
| 2010/0078403 A1 * | 4/2010 | Wimmer | ................. | B66C 23/54 212/299 |
| 2010/0303594 A1 * | 12/2010 | Duell | .................... | B60P 1/6463 414/479 |

(Continued)

*Primary Examiner* — Michael E Gallion
(74) *Attorney, Agent, or Firm* — Nelson Mullins Riley & Scarborough LLP

(57) ABSTRACT

A hoist assembly is disclosed. The hoist assembly can include a frame, a first sheave assembly fixed relative to the frame, a second sheave assembly movable relative to the frame, and a cable engaged with the first sheave assembly and the second sheave assembly. The first sheave assembly can include a first sheave comprising a first axis of rotation and a second sheave comprising a second axis of rotation oriented perpendicular to the first axis of rotation. The second sheave assembly can comprise a third sheave comprising a third axis of rotation and a fourth sheave comprising a fourth axis of rotation angularly-oriented relative to the third axis of rotation. The third axis of rotation and the fourth axis of rotation can be coplanar. The sheaves can be removable and replaceable.

20 Claims, 26 Drawing Sheets

(56) References Cited

U.S. PATENT DOCUMENTS

| | | | | |
|---|---|---|---|---|
| 2011/0200416 A1* | 8/2011 | Doron | ............... | B60P 1/6454 |
| | | | | 414/482 |
| 2013/0089397 A1* | 4/2013 | Downing | ............ | B60P 1/6454 |
| | | | | 414/494 |
| 2013/0126457 A1* | 5/2013 | Sturm, Jr. | ............ | B66C 11/08 |
| | | | | 212/318 |
| 2017/0081144 A1* | 3/2017 | Upmeier | ............ | B65H 57/14 |

\* cited by examiner

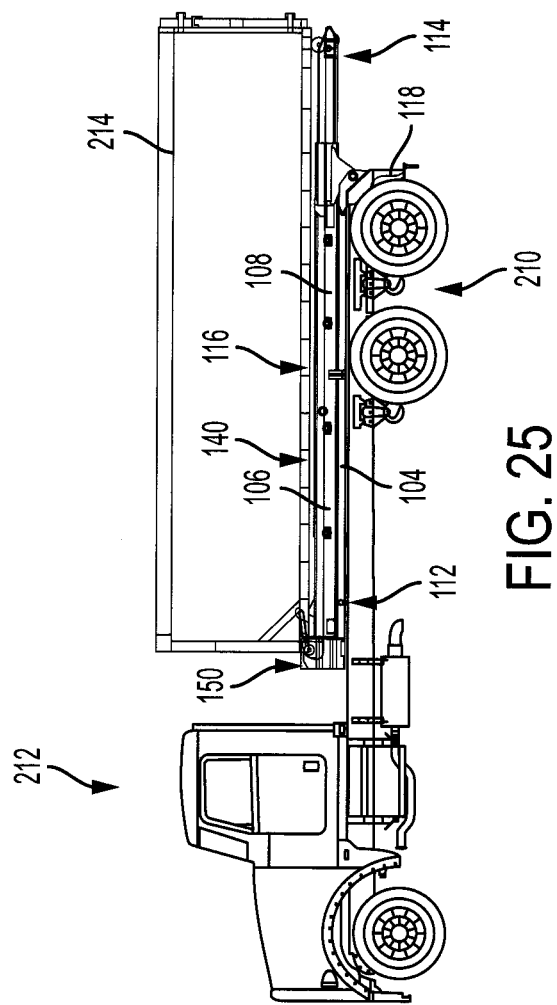

HOIST ASSEMBLY

FIELD

The present disclosure relates to hoist assemblies, methods for assembling and using hoist assemblies, and pulley systems for the same.

BACKGROUND

A hoist assembly can be employed to load objects, such as containers, onto a trailer and/or to unload objects from the trailer. A hoist assembly often includes a stationary main-frame and a pivotable sub-frame or hoist frame. A drive system can be employed to lift or pivot the pivotable sub-frame relative to the stationary main-frame. The hoist assembly may also include a pulley system that can operably engage the object to be loaded onto the trailer. Activation of the pulley system can pull the object onto the pivotable sub-frame of the hoist assembly to position the object on the trailer. Additionally, reverse activation of the pulley system can release the object from the pivotable sub-frame of the hoist assembly to unload the object from the trailer. The pulley system can include moving parts, such as sheaves and/or a cable, for example. It may be desirable to access, service and/or replace parts of the pulley system to extend the lifespan of the pulley system. Additionally, it may be desirable to limit wear to the pulley system and the parts thereof.

The foregoing discussion is intended only to illustrate various aspects of the related art in the field of the invention at the time, and should not be taken as a disavowal of claim scope.

SUMMARY

In at least one form, a hoist assembly comprises a frame, a first sheave assembly fixed relative to the frame, a second sheave assembly movable relative to the frame, and a cable engaged with the first sheave assembly and the second sheave assembly. The first sheave assembly comprises a first sheave comprising a first axis of rotation and a second sheave comprising a second axis of rotation oriented perpendicular to the first axis of rotation. The second sheave assembly comprises a third sheave comprising a third axis of rotation and a fourth sheave comprising a fourth axis of rotation angularly-oriented relative to the third axis of rotation. The third axis of rotation and the fourth axis of rotation are positioned in a plane.

In at least one form, the second sheave assembly comprises a casing defining a first slit and a second slit angularly oriented relative to the first slit. The third sheave is positioned in the first slit, and the fourth sheave is positioned in the second slit.

In at least one form, the casing comprises a top, and the first slit and the second slit are accessible from the top.

In at least one form, the first slit comprises a first access opening having a first length, and the third sheave comprises a third diameter that is less than the first length.

In at least one form, the second slit comprises a second access opening having a second length, and the fourth sheave comprises a fourth diameter that is less than the second length.

In at least one form, the cable extends from the first sheave to the third sheave, from the third sheave to the second sheave, and from the second sheave to the fourth sheave.

In at least one form, the first sheave is positioned forward of the second sheave.

In at least one form, the cable extends over the second sheave to the first sheave, and the cable extends under the second sheave to the third sheave.

In at least one form, the hoist assembly further comprises a drive mechanism coupled to the frame and to the second sheave assembly, the drive mechanism is aligned with an axis, and the axis extends between the third sheave and the fourth sheave of the second sheave assembly.

In at least one form, the first axis of rotation is oriented perpendicular to the axis.

In at least one form, a hoist assembly comprises a frame, a first sheave assembly fixed relative to the frame, a second sheave assembly movable relative to the frame along a longitudinal axis, and a cable engaged with the first sheave assembly and the second sheave assembly. The first sheave assembly comprises a first sheave and a second sheave. The second sheave assembly comprises a third sheave comprising a third axis of rotation and a fourth sheave comprising a fourth axis of rotation angularly-oriented relative to the third axis of rotation. The third axis of rotation and the fourth axis of rotation are positioned in a plane, and the longitudinal axis extends between the third axis of rotation and the fourth axis of rotation and is oriented perpendicular to the plane.

In at least one form, the hoist assembly further comprises a drive mechanism coupled to the frame and the second sheave assembly, and the drive mechanism is aligned with the longitudinal axis.

In at least one form, the drive mechanism comprises a hydraulic cylinder.

In at least one form, the cable extends from the first sheave to the third sheave, from the third sheave to the second sheave, and from the second sheave to the fourth sheave.

In at least one form, the first sheave comprises a first axis of rotation oriented perpendicular to the longitudinal axis, and the second sheave comprises a second axis of rotation oriented perpendicular to the first axis of rotation and to the longitudinal axis.

In at least one form, a hoist assembly for hoisting an object onto a frame comprises a first sheave assembly fixed relative to the frame, a second sheave assembly movable relative to the frame, and a cable engaged with the first sheave assembly and the second sheave assembly. The first sheave assembly comprises a first sheave and a second sheave. The second sheave assembly comprises a casing comprising a first slot and a second slot angularly oriented relative to the first slot. The second sheave assembly also comprises a first replaceable sheave positioned in the first slot and a second replaceable sheave positioned in the second slot.

In at least one form, the first slot comprises a first access opening having a first length, and the first replaceable sheave comprises a first diameter that is less than the first length.

In at least one form, the second slot comprises a second access opening having a second length, and the second replaceable sheave comprises a second diameter that is less than the second length.

In at least one form, the casing further comprises a top, wherein the first access opening and the second access opening are accessible from the top. The casing further comprises a central opening positioned intermediate the first access opening and the second access opening, and the central opening is accessible from the top.

In at least one form, the second sheave assembly comprises a first rotational mount coupled to the first replaceable sheave, wherein the first rotational mount is positioned within the central opening. The second sheave assembly further comprises a second rotational mount coupled to second replaceable fourth sheave, wherein the second rotational mount is positioned within the central opening.

The foregoing discussion is intended only to illustrate various aspects of certain embodiments disclosed in the present disclosure and should not be taken as a disavowal of claim scope.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings as follows:

FIG. 25 is an elevation view of the vehicle and the hoist apparatus of FIG. 22, depicting the hoist apparatus in a lowered orientation, and further depicting the container fully loaded onto the hoist apparatus, according to various embodiments of the present disclosure.

Figure 1:
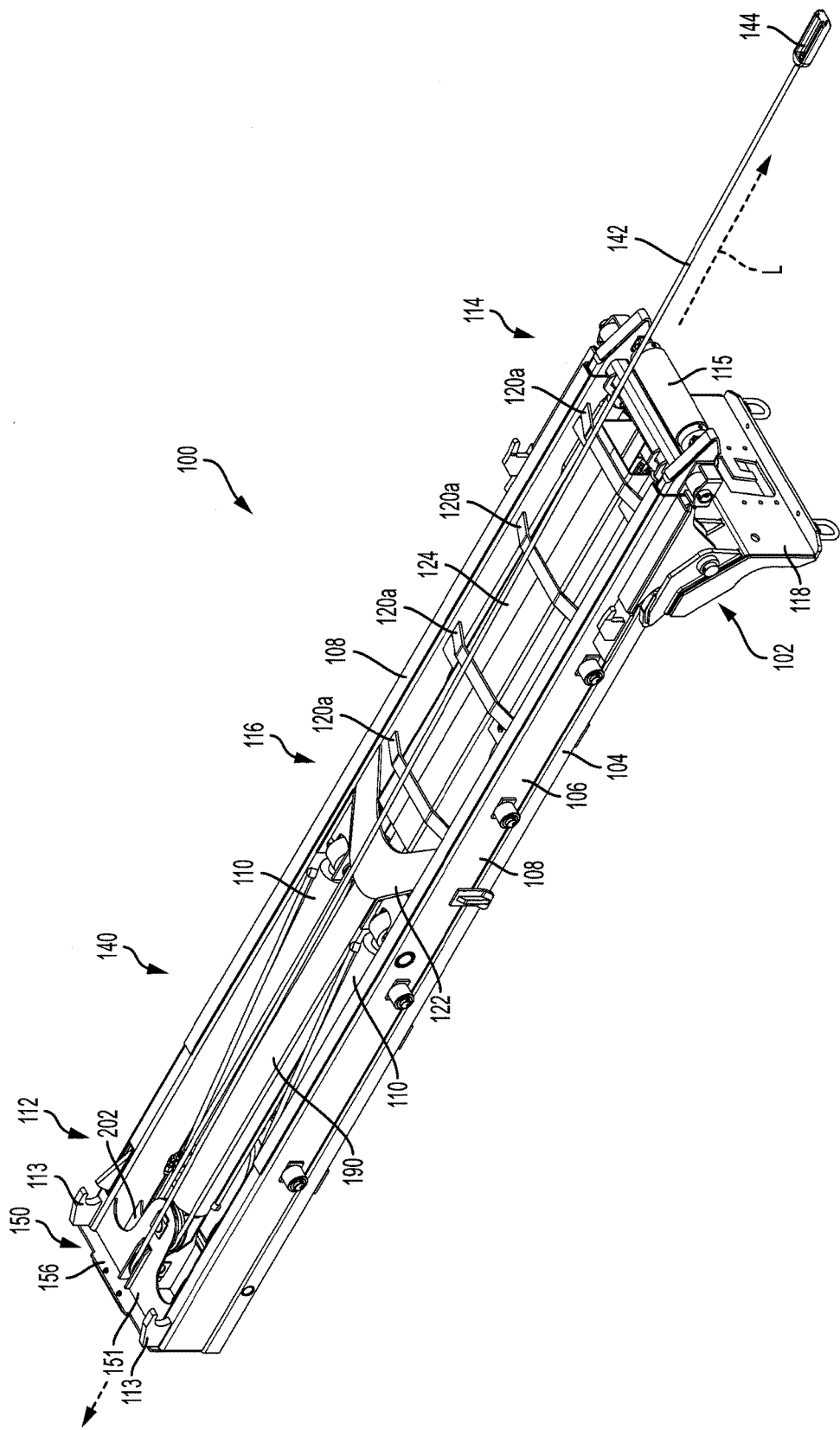
FIG. 1 is a perspective view of a hoist apparatus, according to various embodiments of the present disclosure.
Figure 2:
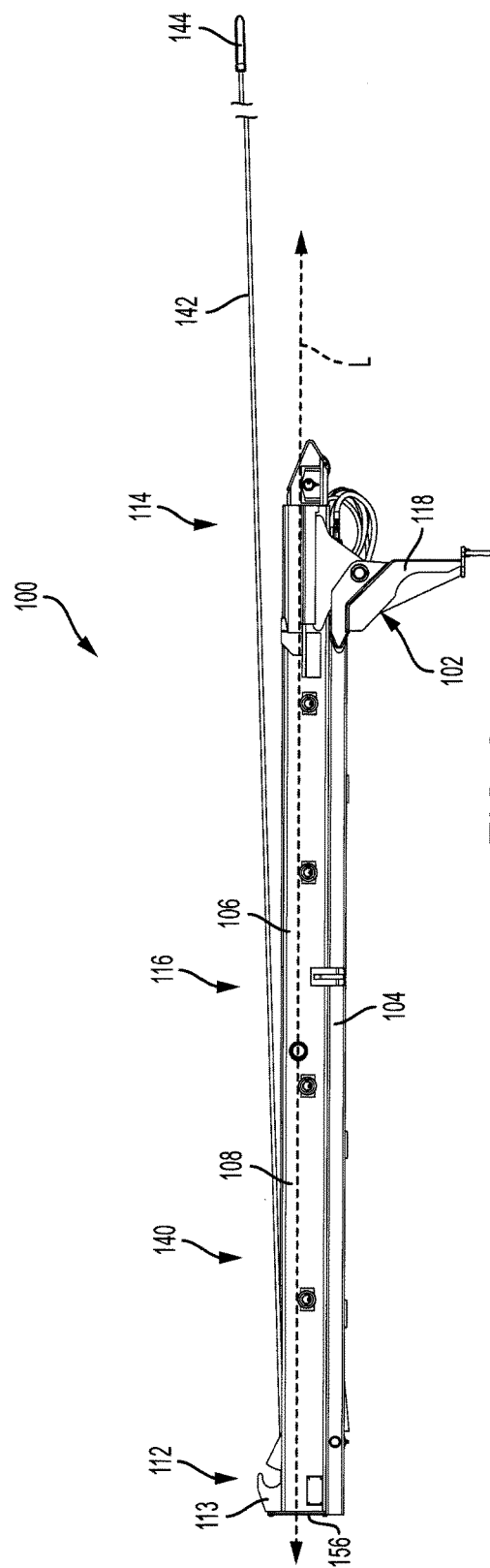
FIG. 2 is an elevation view of the hoist apparatus of FIG. 1, according to various embodiments of the present disclosure.
Figure 3:
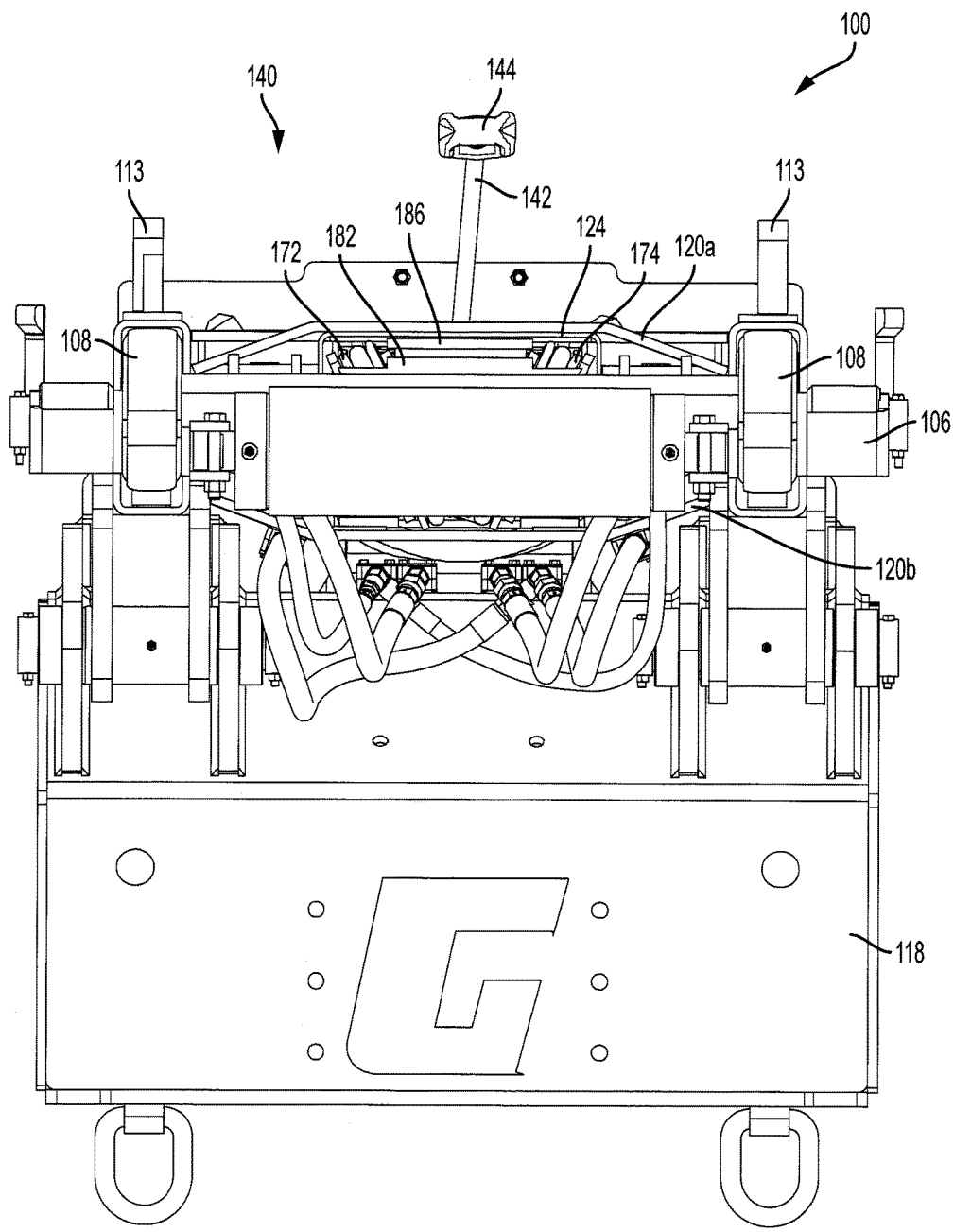
FIG. 3 is another elevation view of the hoist apparatus of FIG. 1, according to various embodiments of the present disclosure.
Figure 4:
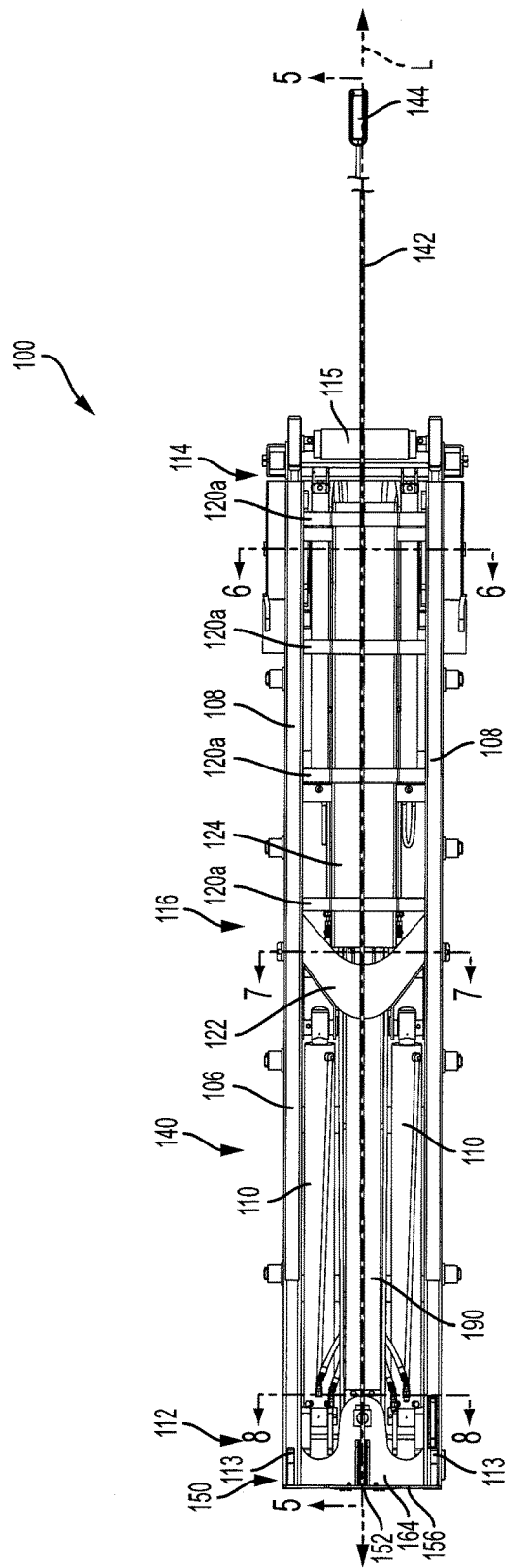
FIG. 4 is a plan view of the hoist apparatus of FIG. 1, according to various embodiments of the present disclosure.
Figure 5:
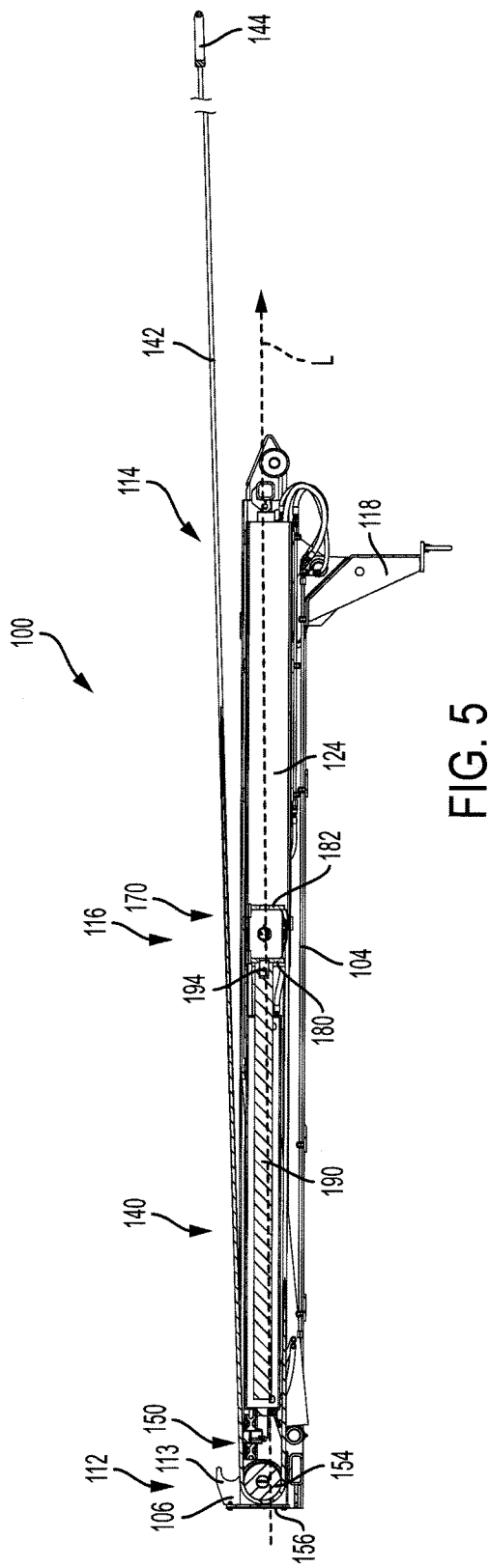
FIG. 5 is a cross-sectional view of the hoist apparatus of FIG. 1 taken along plane 5-5 indicated in FIG. 4, according to various embodiments of the present disclosure.

The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are nonlimiting examples, and thus it can be appreciated that the specific structural and functional details disclosed herein may be representative and illustrative. Variations and changes thereto may be made without departing from the scope of the claims. For example, the features illustrated or described in connection with one exemplary embodiment may be combined with the features of other embodiments. Such modifications and variations are intended to be included within the scope of the present disclosure.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

A hoist apparatus can be employed to hoist an object, such as a container, onto a vehicle and/or trailer. For example, a hoist apparatus can be installed onto and/or integrally formed with the trailer of a vehicle. The hoist apparatus can engage a container and can pull the container onto a hoist frame of the hoist apparatus. In various instances, the hoist apparatus can include a pulley system and a drive mechanism. The drive mechanism can drive the pulley system, which can lift and/or pull an engaged container onto the hoist frame. Moreover, the drive mechanism can drive the pulley system in a reverse direction, which can lower and/or release an engaged container from the hoist frame.

A hoist apparatus 100 is depicted in FIGS. 1-8. As described herein, the hoist apparatus 100 can be employed to hoist a container onto a vehicle and/or a trailer. The hoist apparatus 100 includes a stationary frame 104 and a hoist frame 106 that is configured to pivot relative to the stationary frame 104. The stationary frame 104 can be secured to a trailer and/or vehicle with nuts, bolts, welds, and/or a combination thereof. In other instances, the stationary frame 104 can be integrally formed with the trailer and/or the vehicle. The stationary frame 104 can comprise a plurality of horizontal and vertical rails and/or can comprise a planar body. The hoist frame 106 can be configured to pivot at a joint 102 relative to the stationary frame 104. For example, a drive system can be configured to lift and/or tilt the hoist frame 106 relative to the stationary frame 104 (see, e.g., FIG. 21). Such a drive system can include at least one hydraulic cylinder 110. For example, a pair of hydraulic cylinders 110 can be mounted between the stationary frame 104 and the hoist frame 106. When actuated, the hydraulic cylinders 110 can pivot the hoist frame 106 causing the hoist frame 106 to pivot relative to the stationary frame 104 at the joint 102. When in the lifted orientation (see, e.g., FIG. 21), the hoist frame 106 can form a ramp or inclined surface upon which an object to be loaded can slide and/or roll.

The hoist frame 106 includes a pair of longitudinal members 108, which extend along the length of the hoist frame 106. The longitudinal members 108 can comprise tubular rails or, in other embodiments, I-beams, for example. The hoist frame 106 defines a forward portion 112 and a rearward portion 114, which is rearward of the forward portion 112. An intermediate region 116 is positioned between the forward portion 112 and the rearward portion 114. Referring to the depicted embodiment, a rear guard and/or bumper assembly 118 is positioned at the rearward portion 114 of the hoist assembly 100. The rear guard 118 can extend from the stationary frame 104 of the hoist assembly 100. Additionally or alternatively, the rear guard 118 can be coupled to the hoist frame 106. In certain instances, the rear guard 118 can be attached to the vehicle and/or trailer.

In various instances, the hoist frame 106 can further include at least one roller 115 for supporting an object as it is rolled and/or slid onto the hoist frame 106. For example, the roller 115 depicted in FIGS. 1 and 4 can be positioned relative to the ground or another support surface when the hoist frame 106 is in the lifted orientation. In such an orientation, the roller 115 can roll along the ground during loading and/or unloading operations. The roller(s) 115 can be adjustably positioned to accommodate different sizes and/or types of objects. The hoist frame 106 can further include additional supports and/or guides for guiding an object onto and/or off of the hoist frame 106. In certain instances, the hoist frame 106 can also include at least one hook for engaging and/or holding the object to the hoist frame 106. For example, the hoist frame 106 includes a pair of hooks 113 at the forward portion 112 of the hoist frame. The reader will appreciate that the hoist frame 106 can include additional and/or alternative securing features.

The hoist frame 106 further includes a plurality of transverse supports 120a, 120b extending between the longitudinal members 108. The transverse supports 120a, 120b can be positioned between the intermediate portion 116 and the rearward portion 114 of the hoist frame 106. In various instances, the transverse supports 120a, 120b can include at least one upper transverse support 120a and at least one lower transverse support 120b. A boomerang-shaped support 122 can also extend between the longitudinal members 108. The boomerang-shaped support 122 in the depicted embodiment is positioned in the intermediate portion 116 of the hoist frame 106.

Figure 6:
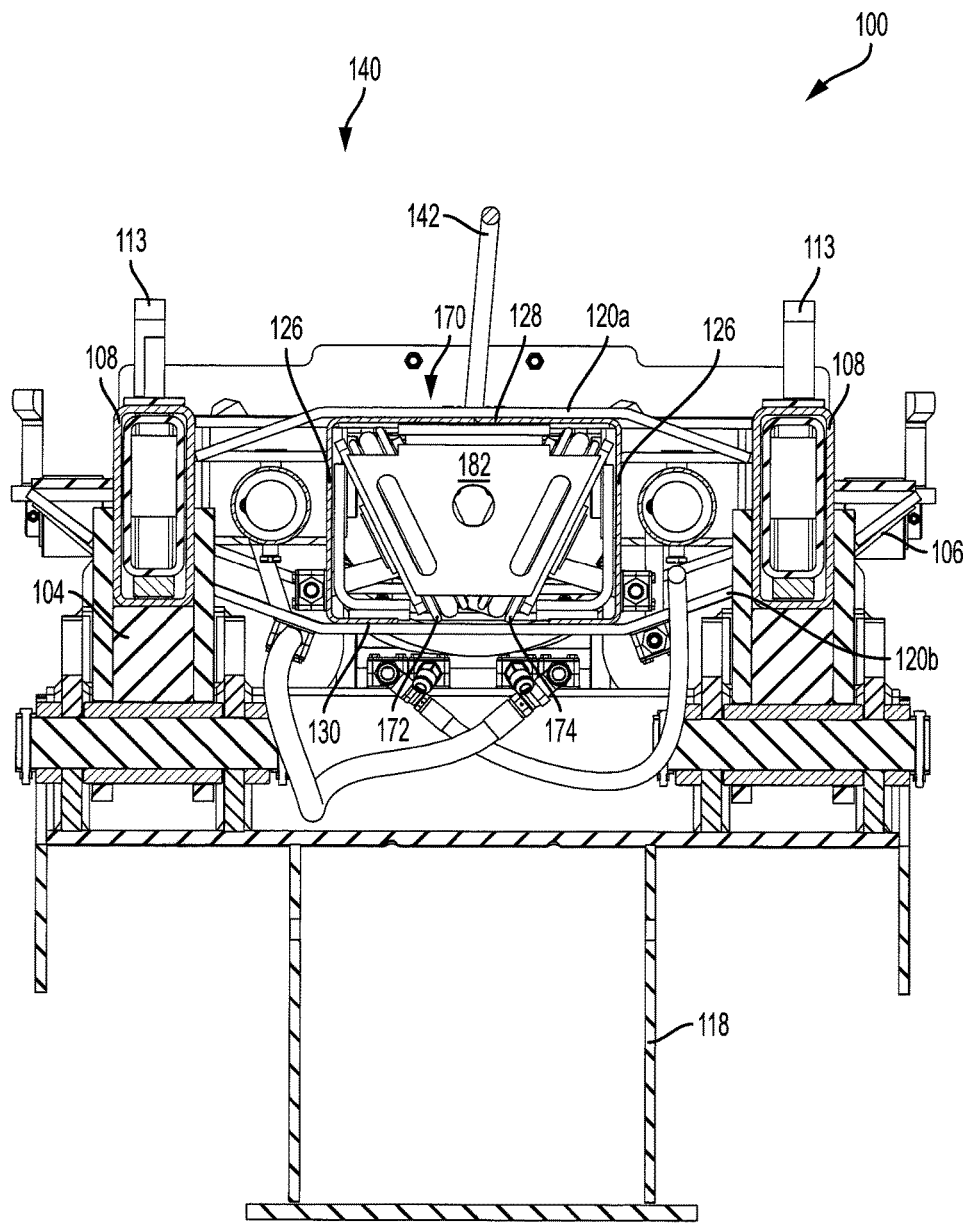
FIG. 6 is a cross-sectional view of the hoist apparatus of FIG. 1 taken along plane 6-6 indicated in FIG. 4, according to various embodiments of the present disclosure.
Figure 7:
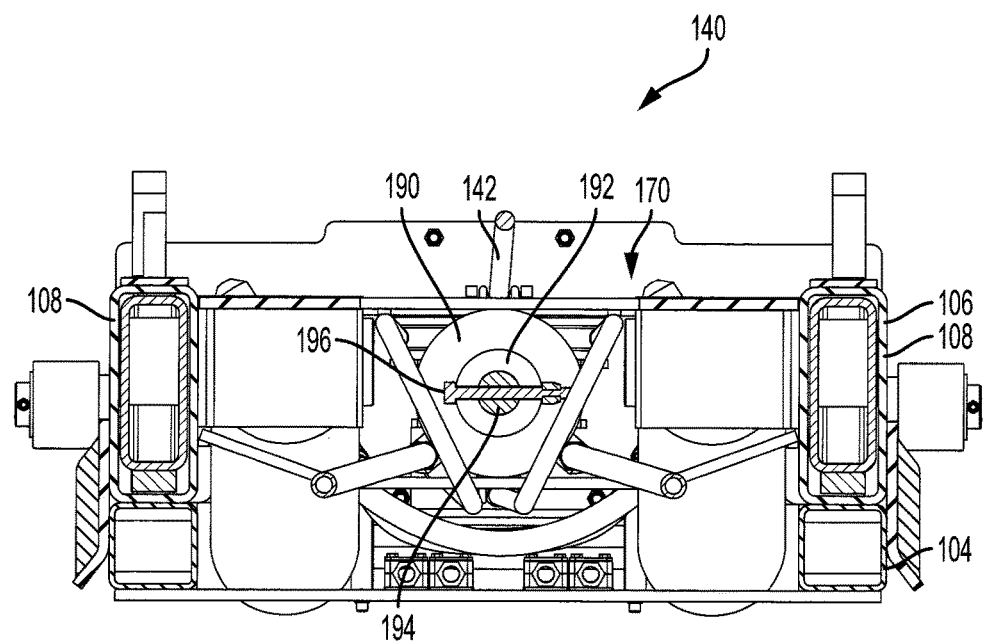
FIG. 7 is a cross-sectional view of the hoist apparatus of FIG. 1 taken along plane 7-7 indicated in FIG. 4, according to various embodiments of the present disclosure.
Figure 8:
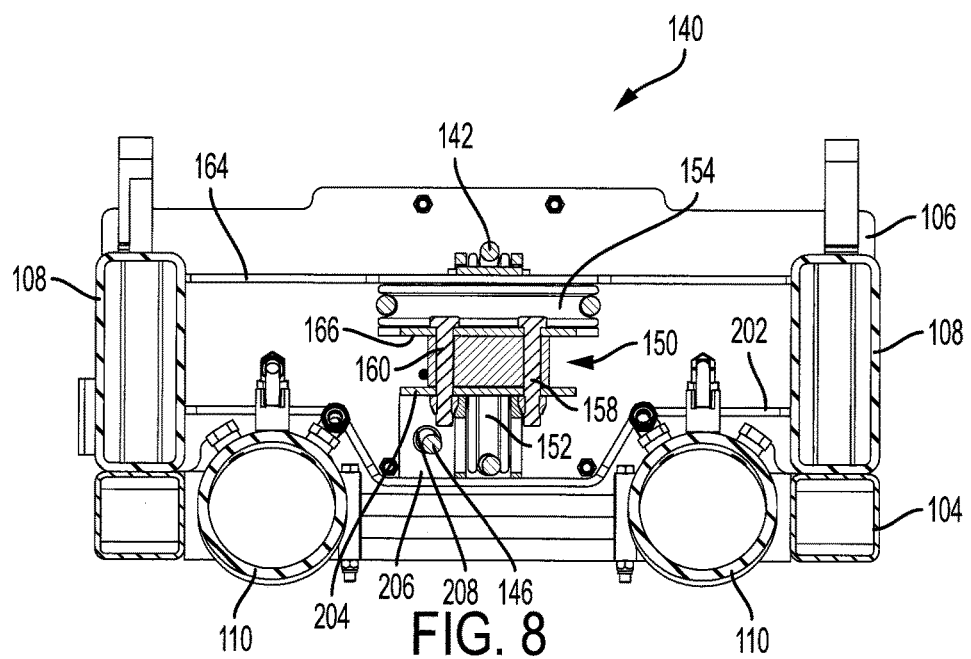
FIG. 8 is a cross-sectional view of the hoist apparatus of FIG. 1 taken along plane 8-8 indicated in FIG. 4, according to various embodiments of the present disclosure.

A track or chute 124 is positioned between the upper and lower transverse supports 120a, 120b of the hoist frame 106. Moreover, the track 124 can extend between the intermediate portion 116 and the rearward portion 114 of the hoist frame 106. Referring primarily to FIG. 6, the track 124 includes sidewalls 126, a top wall 128, and a bottom wall 130, which can form an enclosure or a partial enclosure. In various instances, the track 124 can be formed from a pair of U-shaped beams. In the depicted embodiment, the U-shaped beams are positioned in abutting contact along the top wall 128 of the track 124 and can define a gap therebetween along the bottom wall 130 of the track 124. The track 124 can extend along a longitudinal axis L of the hoist frame 106. As described herein, the track 124 can be configured to support and guide a movable sheave block through the track 124 and along the longitudinal axis L.

The depicted hoist apparatus 100 also includes a pulley system 140 having a cable 142 and a plurality of sheaves. Each sheave can include a groove and/or rim for retaining and guiding the cable 142. The sheaves can be housed in a plurality of sheave blocks. For example, a first sheave assembly or first sheave block 150 can be mounted to the hoist frame 106. The first sheave block 150 can be mounted at the forward portion 112 of the hoist frame 106. The first sheave block 150 can comprise a stationary sheave block. For example, the first sheave block 150 can be fixed to the hoist frame 106. In various instances, the first sheave block 150 can be integrally formed with the hoist frame 106. In other instances, the first sheave block 150 can be securely fixed to the hoist frame 106 by at least one fastener and/or weld, for example. As described herein, the first sheave block 150 can house at least one sheave.

A second sheave assembly or second sheave block 170 (see, e.g., FIGS. 5-7) can also be mounted to the hoist frame 106. The second sheave block 170 can be movably mounted to the hoist frame 106. For example, the second sheave block 170 can be configured to move through and/or translate within the track 124. In such instances, the second sheave 170 can move along the longitudinal axis L defined by the hoist frame 106, and can move relative to the fixed first sheave block 150. In various instances, the second sheave block 170 can be movable between the intermediate portion 116 of the hoist frame 106 and the rearward portion 114 of the hoist frame 106. As described herein, the second sheave block 170 can house at least one sheave.

The cable 142 of the pulley system 140 can engage the first sheave block 150 and the second sheave block 170. For example, the cable 142 can engage the sheaves of each sheave block 150, 170. The cable 142 can include an attachment portion 144 at the free end of the cable 142. The attachment portion 124 can be removably attached to a container to facilitate loading and unloading of the container onto the hoist frame 106, as described herein. In various instances, the cable 142 can be a flexible elongated member, such as a cord, wire, string, belt, and/or rope, for example. The cable 142 can be configured to withstand significant tension forces during loading and unloading of a container onto the hoist frame 106.

Figure 9:
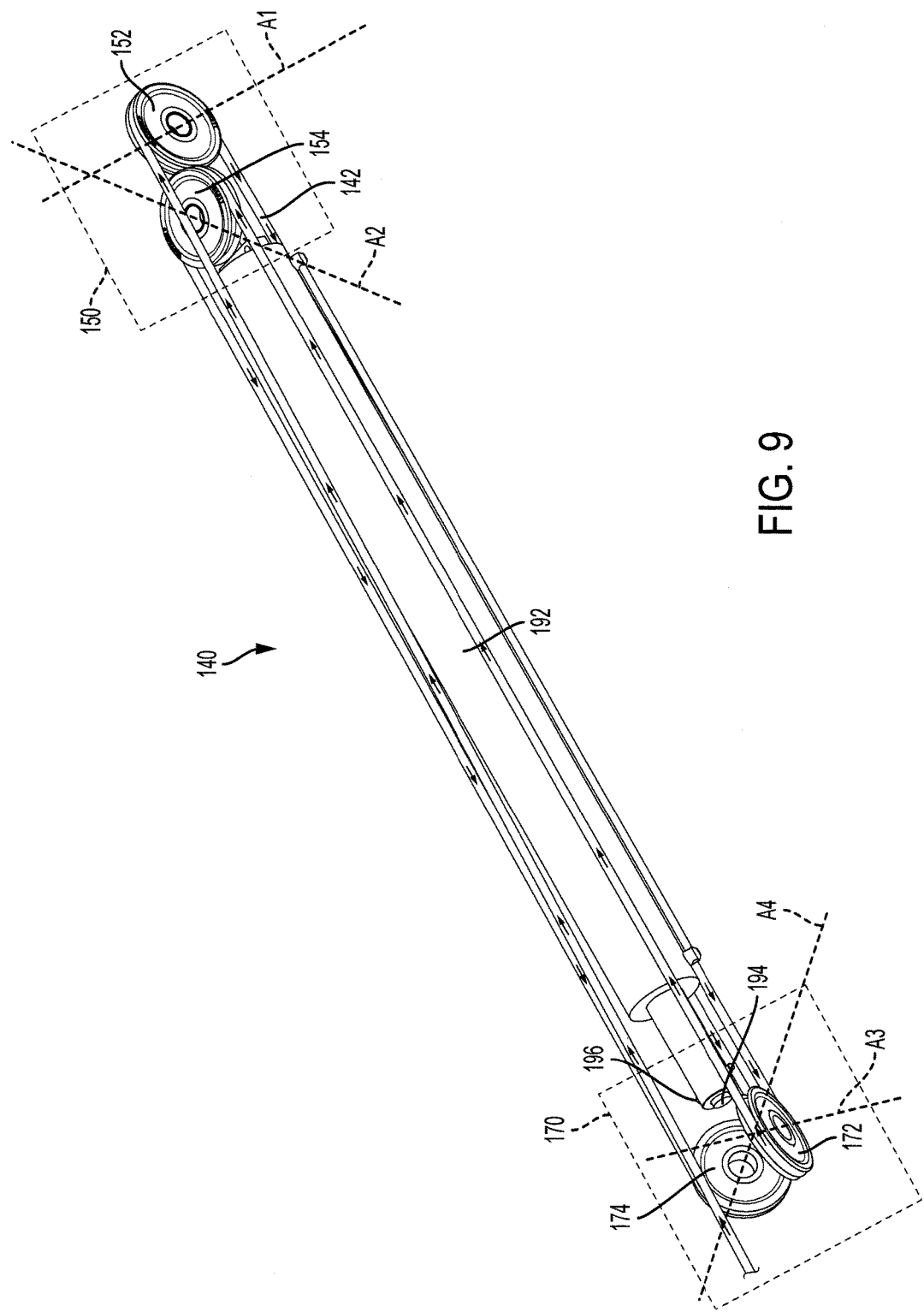
FIG. 9 is a perspective view of a pulley system and a drive mechanism of the hoist apparatus of FIG. 1, according to various embodiments of the present disclosure.
Figure 10:
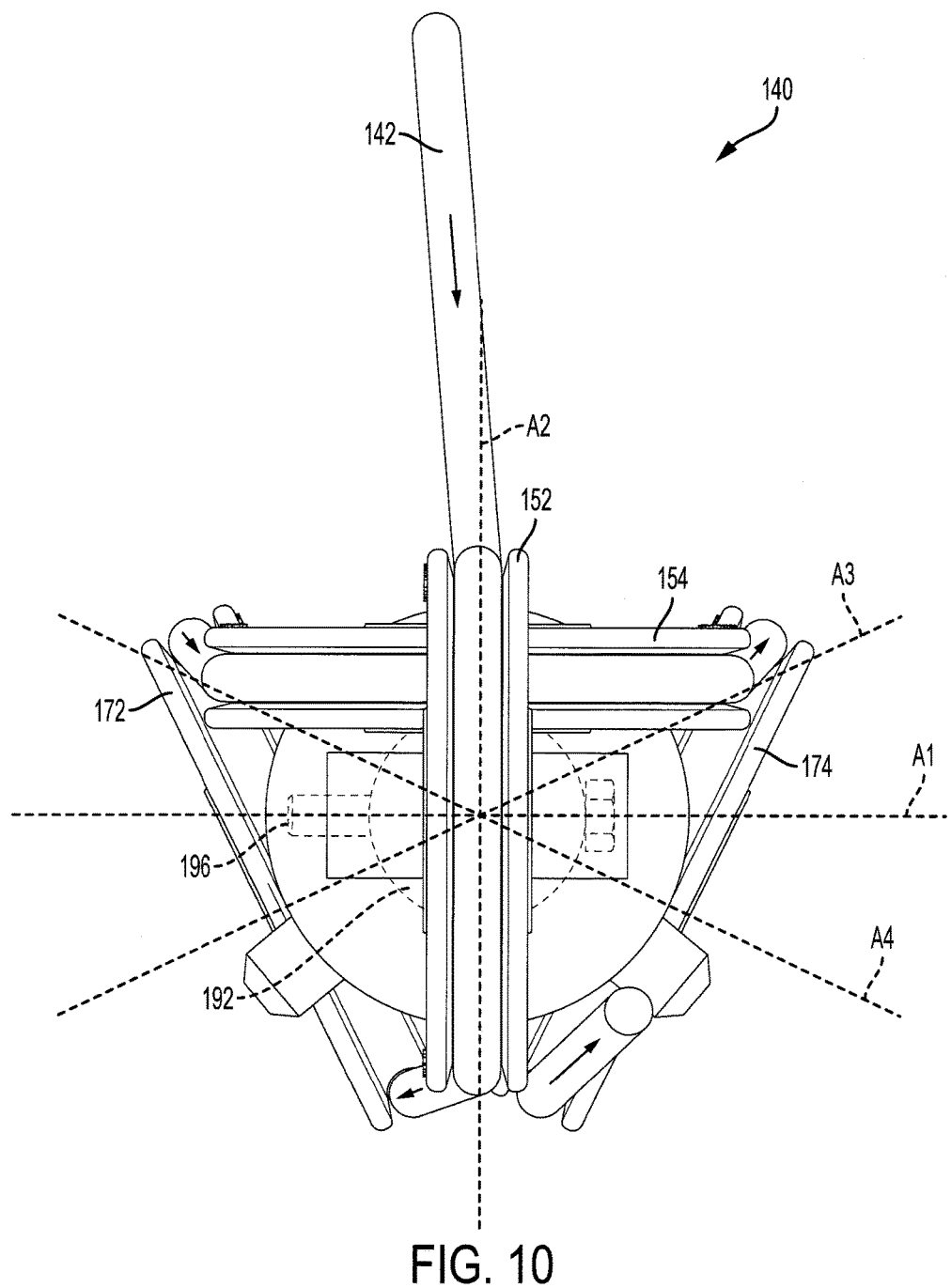
FIG. 10 is an elevation view of the pulley system and the drive mechanism of FIG. 9, according to various embodiments of the present disclosure.
Figure 11:
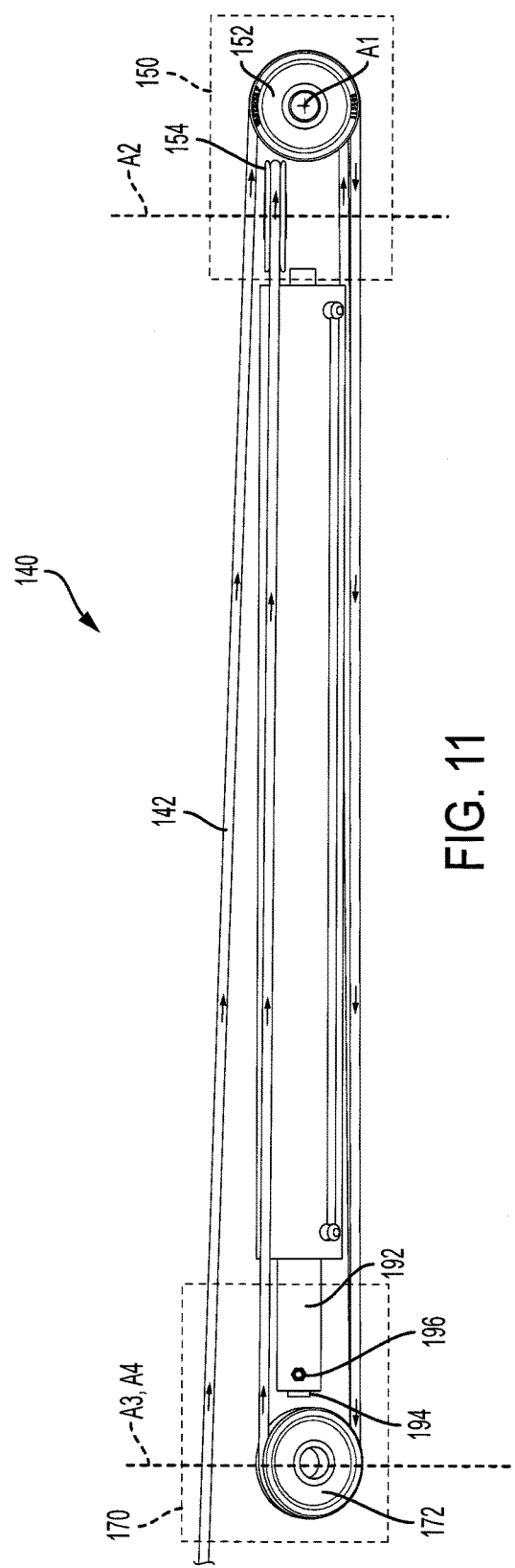
FIG. 11 is another elevation view of the pulley system and the drive mechanism of FIG. 9, according to various embodiments of the present disclosure.
Figure 12:
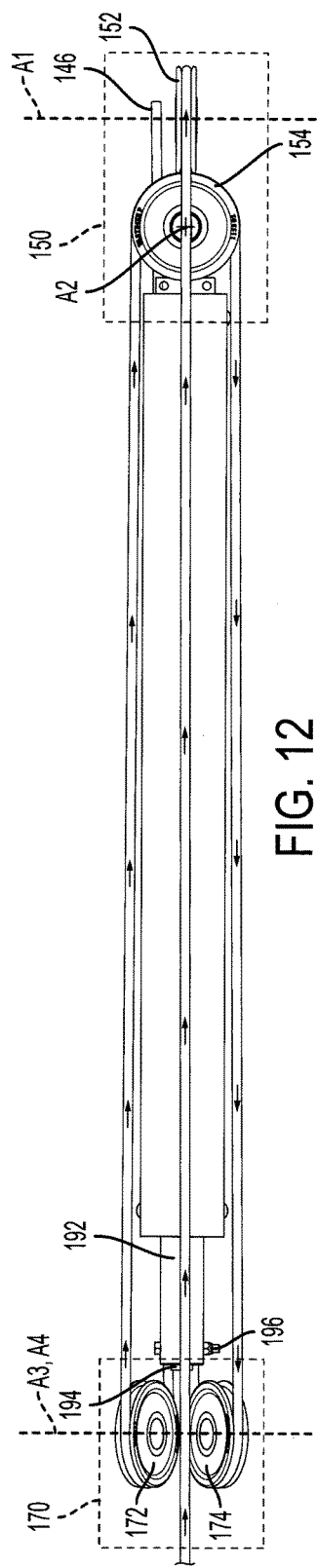
FIG. 12 is a plan view of the pulley system and the drive mechanism of FIG. 9, according to various embodiments of the present disclosure.

Referring now to FIGS. 9-12, the route of the cable 142 relative to the sheave blocks 150, 170 is depicted. The first sheave block 150 and the second sheave block 170 are schematically depicted in FIGS. 9, 11, and 12 for illustrative purposes. Moreover, the sheaves of the first sheave block 150 and the second sheave block 170 are shown in FIGS. 9-12. The first sheave block 150 houses a first sheave 152 and a second sheave 154, and the second sheave block 170 houses a third sheave 172 and a fourth sheave 174. A drive mechanism 190 for moving the second sheave block 170 is also depicted in FIGS. 9-12. Moreover, an attachment rod 194 of the second sheave block 170 and a locking pin 196 for attaching the attachment rod 194 to the drive mechanism 190 is also shown in FIGS. 9-12. The attachment rod 194 and the locking pin 196 are described in further detail herein. In the depicted arrangement, the drive mechanism 190 is positioned between the first sheave block 150 and the second sheave block 170. As further described herein, the drive mechanism 190 can be coupled to the hoist frame 106 and to the second sheave block 170. Moreover, actuation of the drive mechanism 190 can displace the second sheave block 170 relative to the hoist frame 106 and relative to the first sheave block 150 that is fixed to the hoist frame 106.

The sheaves 152, 154, 172, 174 can be configured to rotate above their respective axes of rotation A1, A2, A3, A4, respectively. For example, the first sheave 152 can be configured to rotate about the first axis A1, the second sheave 154 can be configured to rotate about the second axis A2, the third sheave 172 can be configured to rotate about the third axis A3, and the fourth sheave 174 can be configured to rotate about the fourth axis A4. As described in greater detail herein, the first axis A1 can be oriented perpendicular, or substantially perpendicular, to the second axis A2. For example, the first axis A1 can be aligned with a horizontal axis relative to the hoist frame 106 and the second axis A2 can be aligned with a vertical axis relative to the hoist frame 106. Moreover, the third axis A3 is angularly-oriented relative to the fourth axis A4. The third axis A3 and the fourth axis A4 are also angularly-oriented relative to the first axis A1, the second axis A2, and the longitudinal axis L.

In various instances, the cable 142 engages the sheaves 152, 154, 172, and 174 of the pulley assembly 140 between the attachment portion 144 of the cable 142 and a fixed end 146 (FIG. 12) of the cable 142. For example, the cable 142 can extend from the attachment portion 144 to the first sheave block 150, from the first sheave block 150 to the second sheave block 170, from the second sheave block 170 back to the first sheave block 150, from the first sheave block 150 back to the second sheave block 170, and from the second sheave block 170 to the fixed end 146. In various instances, the cable 142 can engage the first sheave 152 positioned in the first sheave block 150. The cable 142 can then exit the first sheave block 150 and extend to the second sheave block 170. In various instances, the cable 142 can then engage the third sheave 172 positioned in the second sheave block 170. The cable 142 can then exit the second sheave block 170 and return to the first sheave block 150. As depicted in FIGS. 9-12, the cable 142 can then engage the second sheave 154 positioned in the first sheave block 150. The cable 142 can then exit the first sheave block 150 and return to the second sheave block 170. In the second sheave block 170, the cable 142 can engage the fourth sheave 174. This route of the cable 142 from the attachment portion 144 toward the fixed end 146 is depicted with arrows in FIGS. 9-12.

The path of the cable 142 of the pulley system 140 can be selected to minimize any obstructions or interference as the cable 142 travels through the pulley system 140. Additionally, the path of the cable 142 can be selected to minimize occurrences of the cable 142 rubbing against itself or other components of the hoist apparatus 100. For example, referring primarily to FIG. 11, the cable 142 can extend between the third pulley 172 and the second pulley 154 at a height that provides clearance above the drive mechanism 190 and clearance below the cable 142 extending to the first pulley 152 from the attachment portion 144.

In various instances, as the second sheave block 170 moves through the track 124 in the hoist frame 106, the attachment portion 144 of the cable 142 can be drawn forward. Stated differently, as the distance between the second sheave block 170 and the first sheave block 150 increases, the length of the cable 142 exiting the fourth sheave 174 and extending to the attachment portion 144 can be reduced, which can shift the attachment portion 144 toward the first sheave block 150 at the forward portion 112 of the hoist frame 106.

Figure 13:
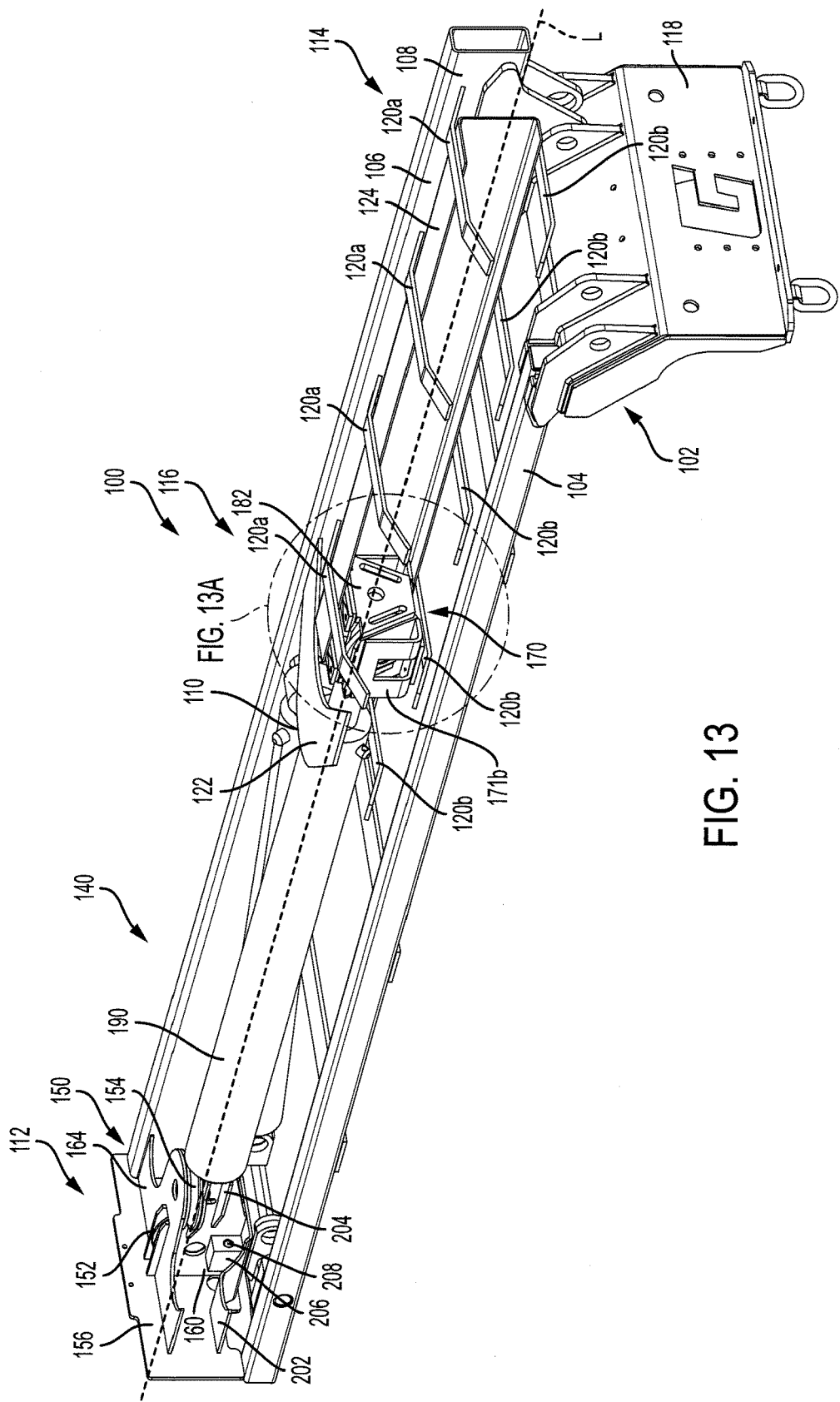
FIG. 13 is a perspective view of the hoist apparatus of FIG. 1 with various elements removed for illustrative purposes, according to various embodiments of the present disclosure.
Figure 13A:
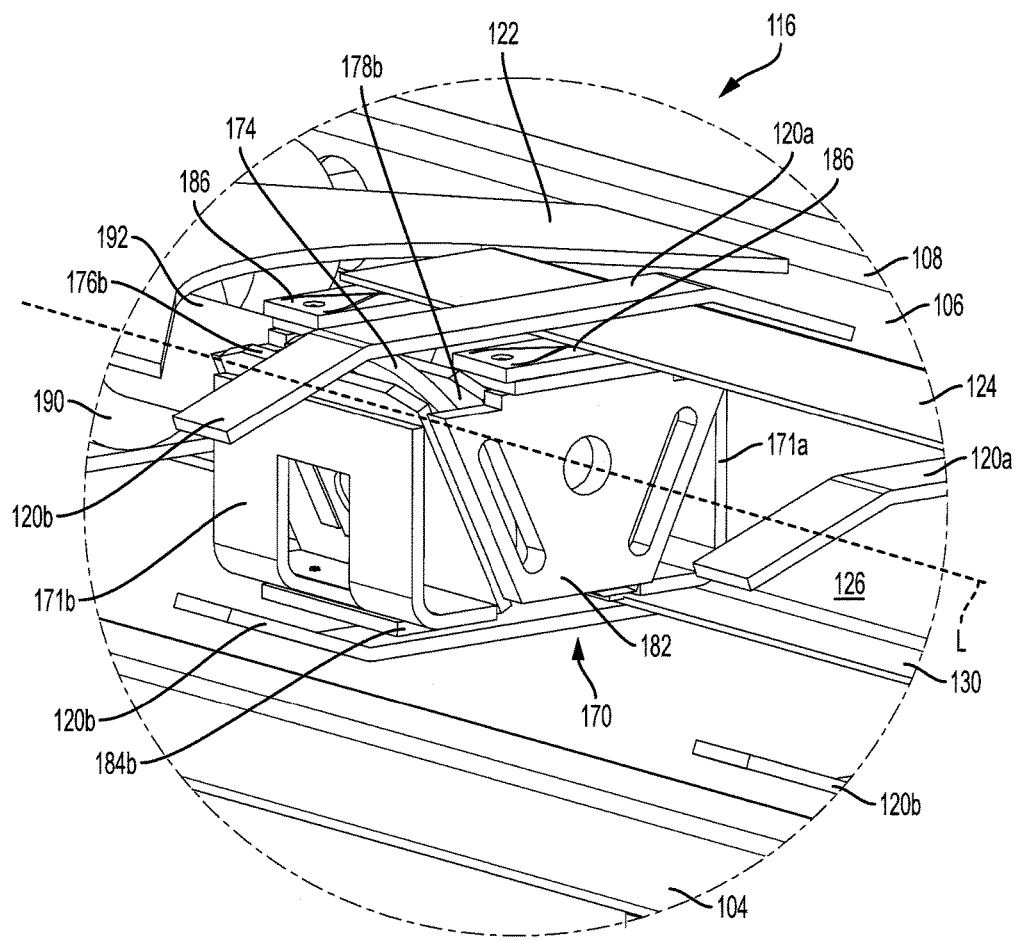
FIG. 13A is a detail view of the hoist apparatus of FIG. 13, according to various embodiments of the present disclosure.
Figure 14:
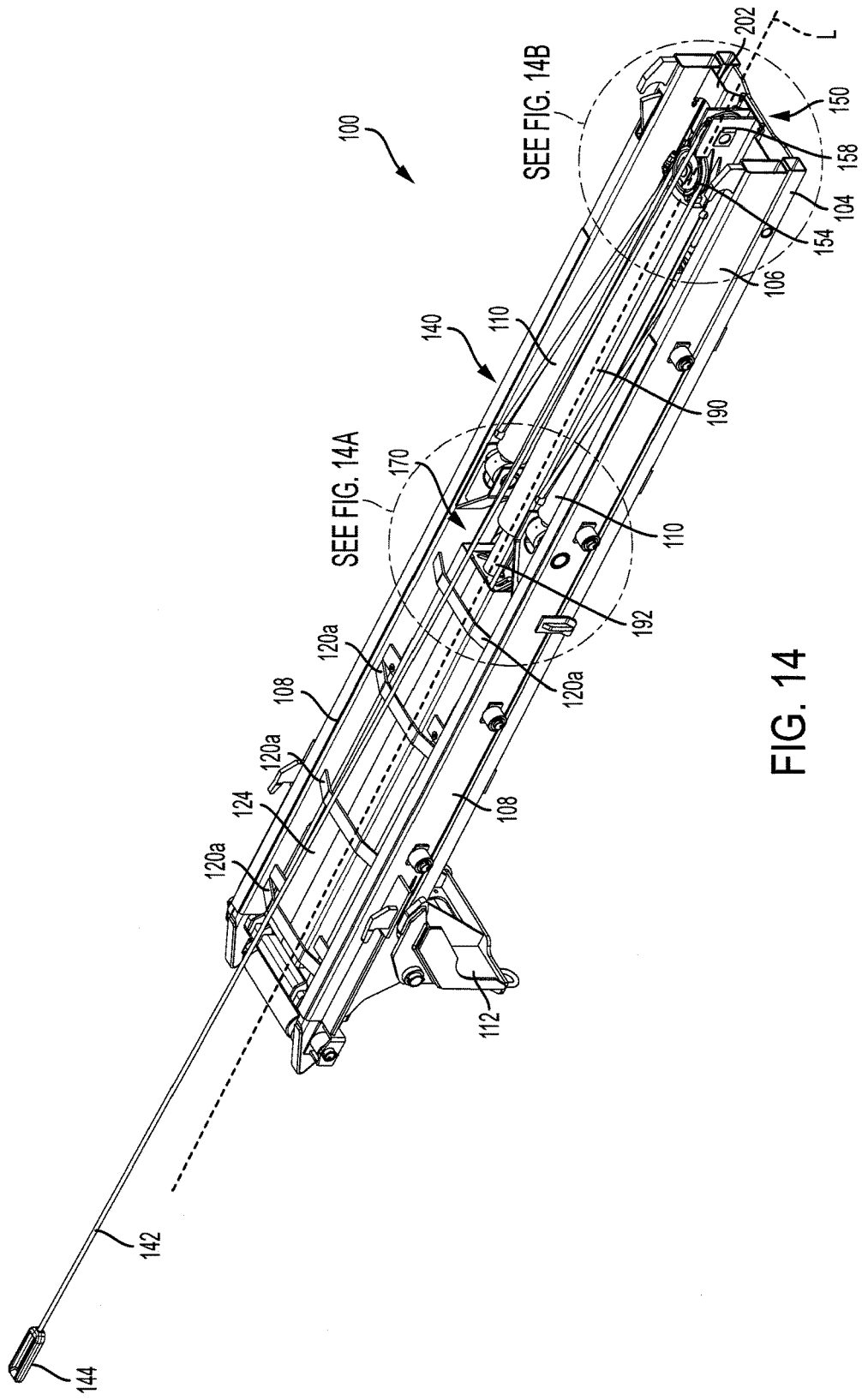
FIG. 14 is a perspective view of the hoist apparatus of FIG. 1 with various elements removed for illustrative purposes, according to various embodiments of the present disclosure.
Figure 14B:
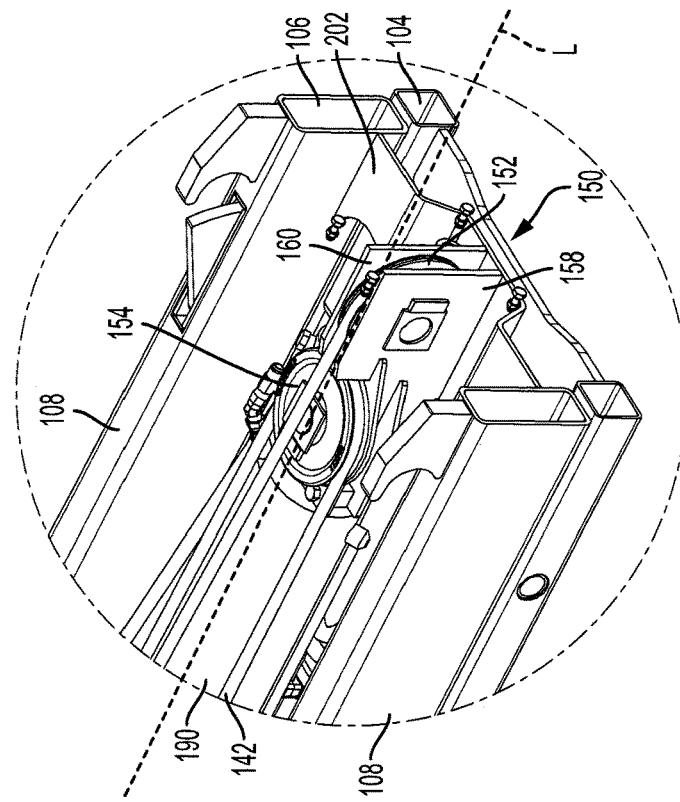
FIG. 14B is another detail view of the hoist apparatus of FIG. 14, according to various embodiments of the present disclosure.
Figure 14A:
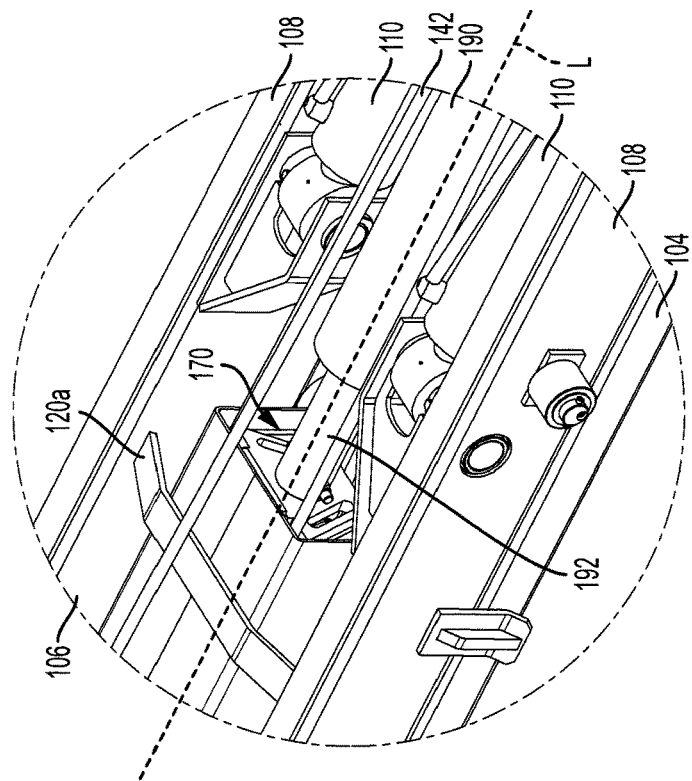
FIG. 14A is a detail view of the hoist apparatus of FIG. 14, according to various embodiments of the present disclosure.

Referring now to FIGS. 13-14B, the hoist assembly 100 is depicted with portions removed for illustrative purposes. For example, a longitudinal member 108 and a side of the track 124 are removed in FIGS. 13, 13A, and 13B, revealing the second sheave block 170 within the track 124 and positioned in the intermediate portion 116 of the hoist assembly 100. The drive mechanism 190 is positioned between the hoist frame 106 and the second sheave block 170. Moreover, actuation of the drive mechanism 190 can displace the second sheave block 170 relative to the hoist frame 106, and thus, relative to the first sheave block 150 fixed to the hoist frame 106. Actuation of the drive mechanism 190 can drive the second sheave block 170 through the track 124 to adjust the pulley system 140. For example, the second sheave block 170 can be configured to move along the longitudinal axis L, which can be aligned with the drive mechanism 190.

In the depicted embodiment, the drive mechanism 190 is shown in an unactuated position. When the drive mechanism 190 is unactuated, the second sheave block 170 is positioned in the intermediate portion 116 of the hoist frame 106. As described herein, a piston 192 of the drive mechanism 190 can be coupled to the second sheave block 170 via the rod 194 and the locking pin 196. When the drive mechanism 190 is actuated, the piston 192 can extend from the drive mechanism 190 toward the rearward portion 114 of the hoist frame 106. In such instances, the drive mechanism 190 and the piston 192 thereof can push the second sheave block 170 along the track 124 toward the rearward portion 114 of the hoist frame 106. Accordingly, the second sheave block 170 can be displaced relative to the first sheave block 150 at the forward portion 112 of the hoist frame 106. Moreover, the attachment portion 144 of the cable 142 can be drawn toward the forward portion 112 of the hoist frame 106.

Figure 15:
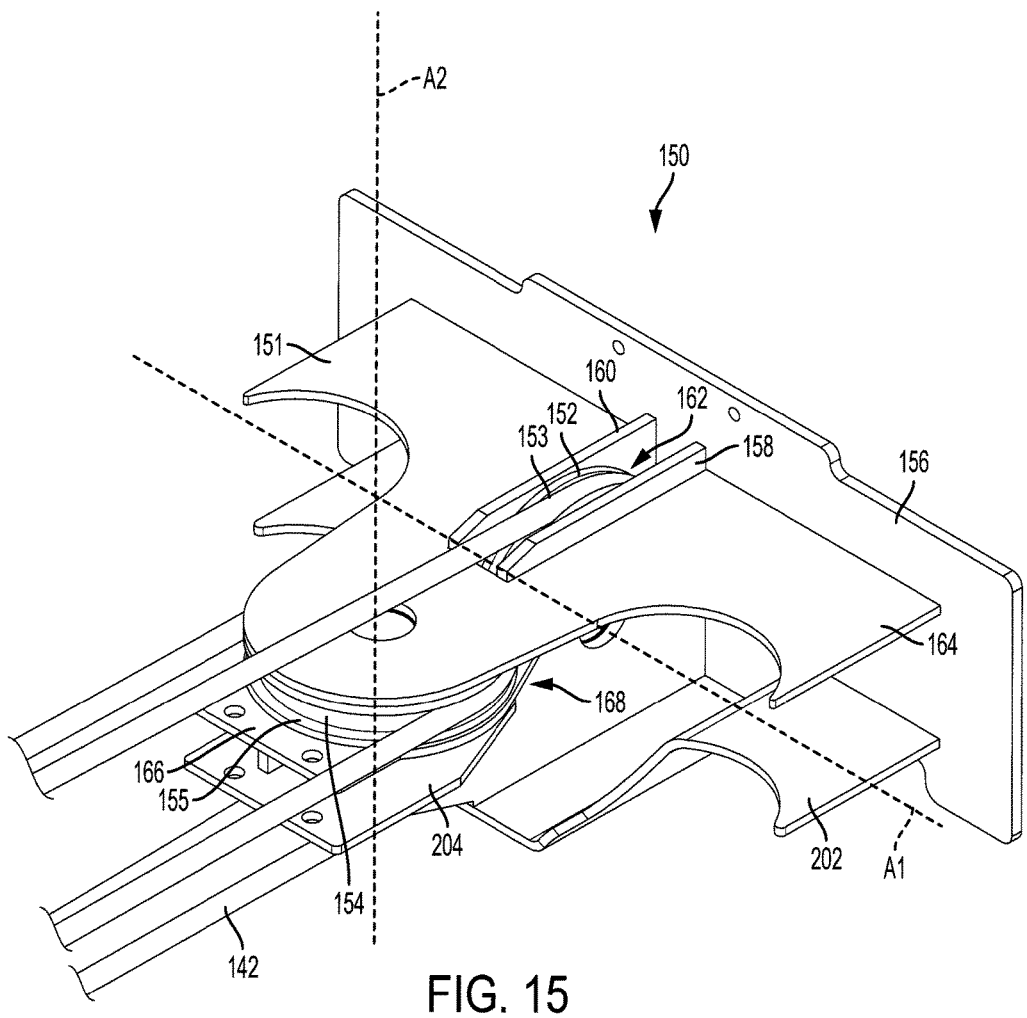
FIG. 15 is a perspective view of a stationary sheave block of the hoist apparatus of FIG. 1 and a portion of the cable of the pulley system of FIG. 9, according to various embodiments of the present disclosure.
Figure 16:
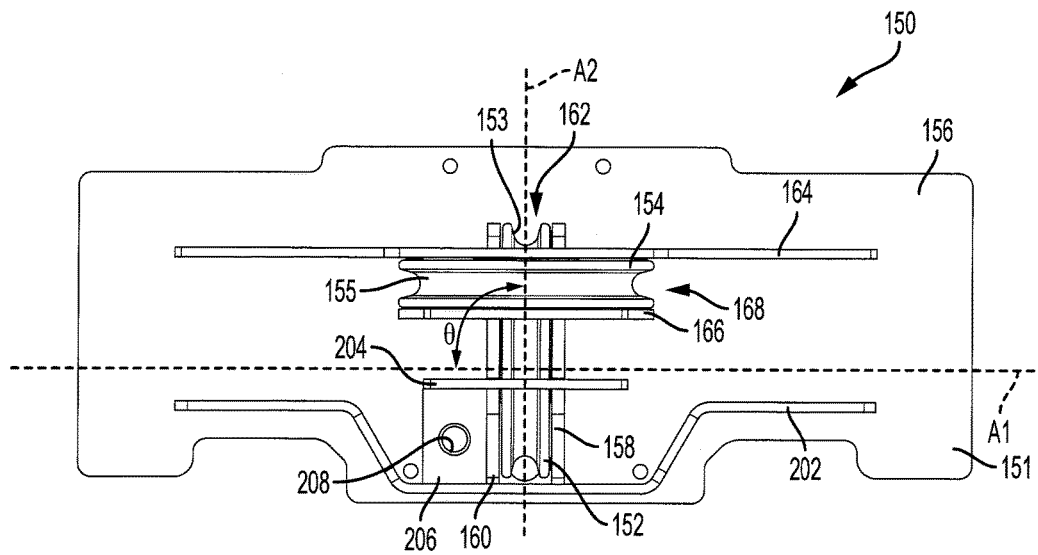
FIG. 16 is an elevation view of the stationary sheave block of FIG. 15, according to various embodiments of the present disclosure.
Figure 17:
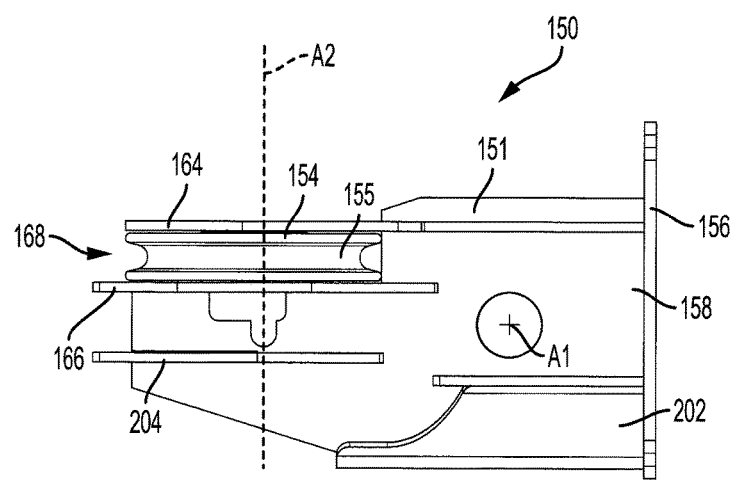
FIG. 17 is another elevation view of the stationary sheave block of FIG. 15, according to various embodiments of the present disclosure.

Referring primarily now to the first sheave block 150 depicted in FIGS. 15-17, the first sheave block 150 includes a frame 151 comprised of a plurality of plates. For example, the frame 151 includes a forward-facing plate 156. In various instances, the forward-facing plate 156 can form the forward end of the hoist frame 106. At least one plate can extend from the forward-facing plate 156. For example, the first sheave block 150 includes a pair of vertical plates 158 and 160 mounted to the forward-facing plate 156. The vertical plates 158, 160 define a vertical slit or space 162 therebetween that is dimensioned and structured to receive the first sheave 152. As a result of this arrangement, the first sheave 152 can be oriented vertically relative to the hoist frame 106 and the first axis A1 can be oriented horizontally relative to the hoist frame 106. Stated differently, the first axis A1 is oriented perpendicular, or substantially perpendicular, to the longitudinal axis L that is aligned with the drive mechanism 190 in the hoist frame. The first sheave 152 can be configured to rotate about the first axis A1 and within the vertical space 162 during operation of the pulley system 140. Referring still to FIGS. 15-17, the first sheave 152 can include a cable-receiving groove 153 that is dimensioned and structured to receive and guide the cable 142.

The first sheave block 150 can further include at least one horizontal plate. For example, the first sheave block 150 can include a pair of horizontal plates 164 and 166 which define a horizontal slit or space 168 therebetween. The horizontal space 168 therebetween is dimensioned and structured to receive the second sheave 154. As a result of this arrangement, the second sheave 154 can be oriented horizontally relative to the hoist frame 106 and the second axis A2 can be oriented vertically relative to the hoist frame 106. Stated differently, the second axis A2 is oriented perpendicular, or substantially perpendicular, to the longitudinal axis L that is aligned with the drive mechanism 190 in the hoist frame. The second sheave 154 can be configured to rotate within the horizontal space 168 during operation of the pulley system 140. Referring still to FIGS. 15-17, the second sheave 154 can include a cable-receiving groove 155 that is dimensioned and structured to receive and guide the cable 142. In the depicted embodiment, the top horizontal plate 164 can extend around the vertical plates 158 and 160. In such instances, the first sheave 152 can be positioned adjacent to the forward-facing plate 156 and the second sheave 154 can be positioned rearward of the first sheave 152.

The first sheave block 150 depicted in FIGS. 15-17 further includes a second pair of horizontal plates 202 and 204. The second pair of horizontal plates 202, 204 can support a mounting block 206 therebetween. The mounting block 206 includes an aperture 208 that is configured to receive the fixed end 146 (FIG. 12) of the cable 142. The fixed end 146 of the cable 142 can be secured within the mounting block 206 such that the fixed end 146 is fixed and/or locked relative to the hoist frame 106. In certain instances, the mounting block 206 can be separate from the first sheave block 150. For example, the mounting block 206 could be mounted to another fixed element within the hoist frame, such as a longitudinal member 108, for example. In various instances, at least two of the plates forming the frame 151 of the first sheave block 150 can be secured together. For example, the plates can be welded together to form the frame 151.

Referring primarily now to FIG. 16, the first sheave 152 is oriented at an angle θ relative to the second sheave 154. In the depicted embodiment, the angle θ is 90 degrees, i.e., a right angle, or substantially 90 degrees, such that the first sheave 152 is oriented perpendicular, or substantially perpendicular, to the second sheave 154. Moreover, the second sheave 154 is positioned rearward of the first sheave 152. Accordingly, the second axis A2 is positioned rearward of the first axis A1. In such instances, the cable 142 extends over the second sheave 154 en route to the first sheave 152 and under the second sheave 154 en route from the first sheave 152. Stated differently, the cable 142 extends over the second sheave 154 to reach and engage the first sheave 152 and extends under the second sheave 154 to extend from the first sheave 152 of the first sheave block 150 to the third sheave 172 of the second sheave block 170.

Owing at least in part to the vertical orientation of the first sheave 152, wear to the cable 142 and the first sheave 152 can be reduced. For example, in a conventional pulley system, the stationary sheave block may include a sheave oriented at an angle, such as a 21 degree angle, relative to the vertical axis. The angled orientation of such a sheave may increase wear to the cable and/or to the sheave because the forces in the cable may be unbalanced and/or asymmetrical relative to the sheave. Conversely, the vertical orientation of the first sheave 152 can facilitate balance and symmetry of the forces exerted on the first sheave 152 by the cable 142.

Figure 18:
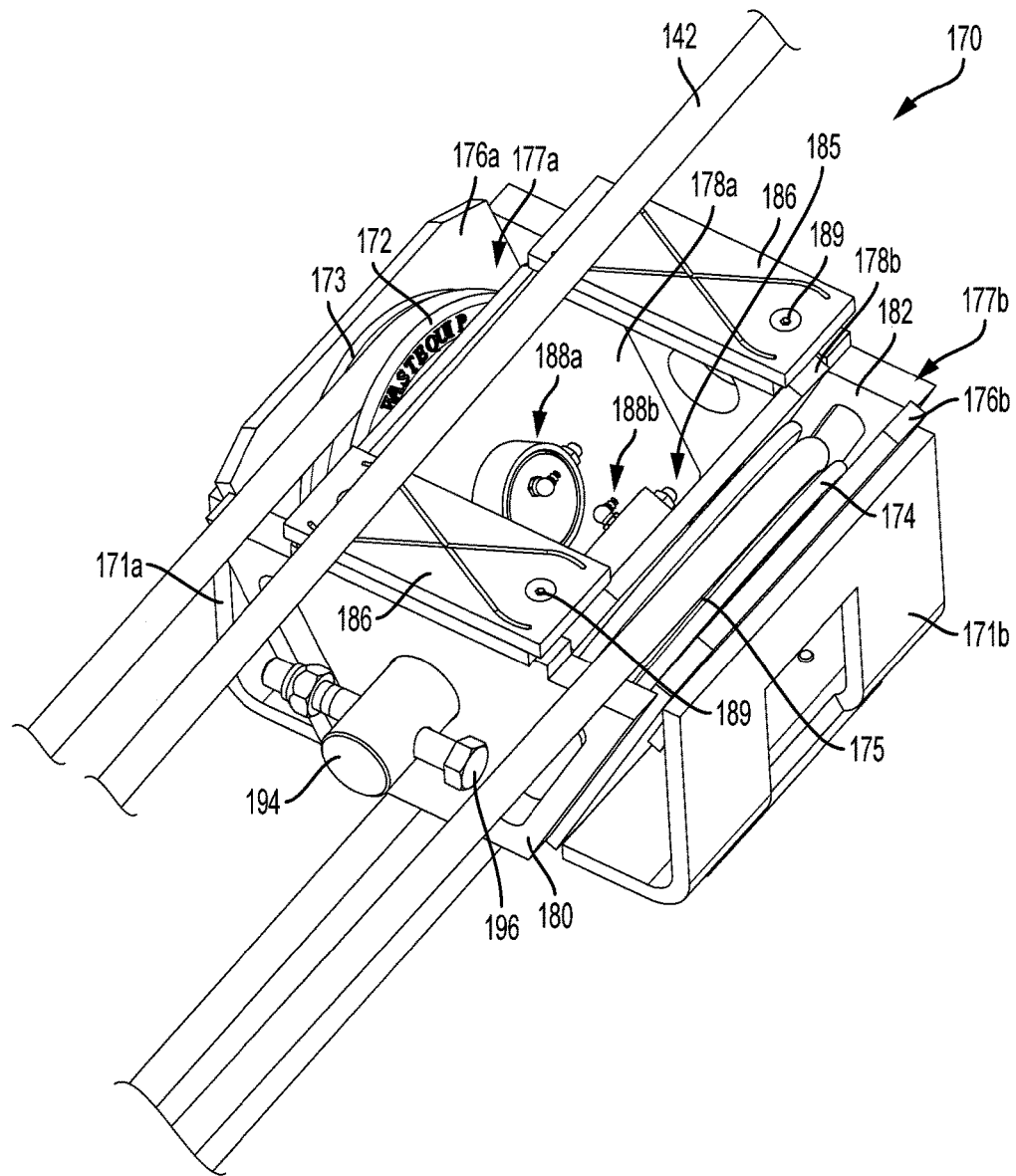
FIG. 18 is a perspective view of a movable sheave block of the hoist apparatus of FIG. 1 and a portion of the cable of the pulley system of FIG. 9, according to various embodiments of the present disclosure.
Figure 19:
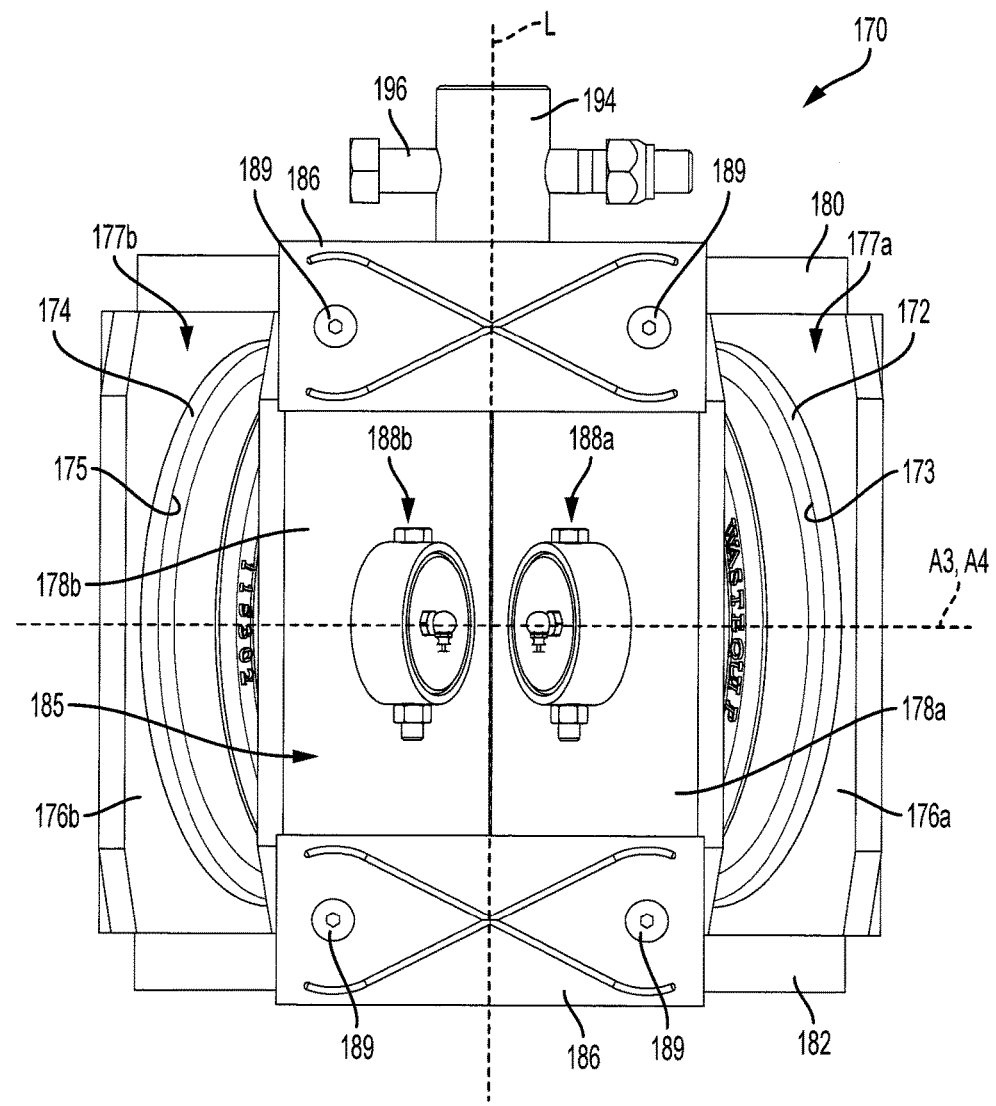
FIG. 19 is a plan view of the movable sheave block of FIG. 18, according to various embodiments of the present disclosure.
Figure 20:
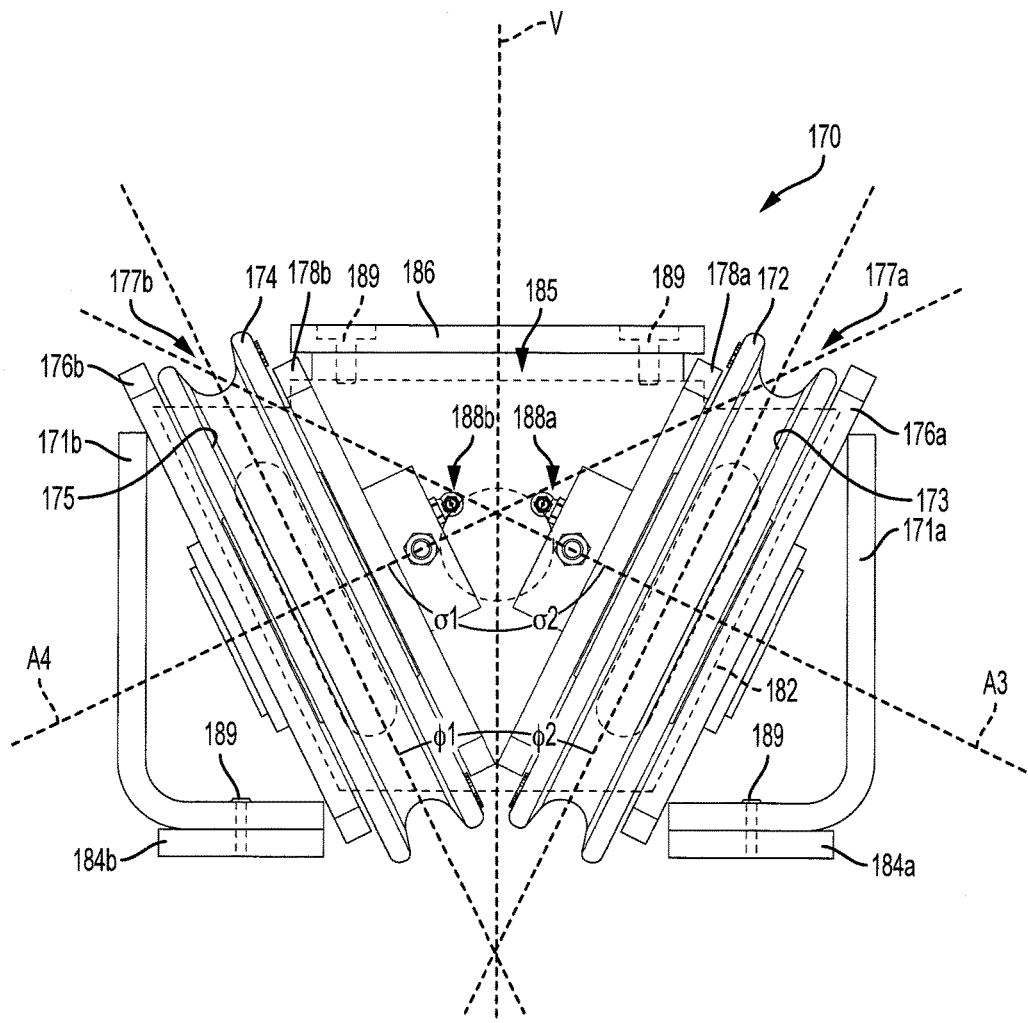
FIG. 20 is an elevation view of the movable sheave block of FIG. 18, according to various embodiments of the present disclosure.

Referring primarily now to FIGS. 18-20, the second sheave block 170 is depicted. The second sheave block 170 includes a two-part frame 171a, 171b that is configured to house and support the third sheave 172 and the fourth sheave 174. In the depicted embodiment, each side of the frame 171a, 171b forms an L-shape bracket that partially encloses the second sheave block 170. The second sheave block 170 further includes a forward plate 180 and a rearward plate 182. Within the boundary defined by the two-part frame 171a, 171b, the forward plate 180, and the rearward plate 182, the third sheave 172 and the fourth sheave 174 are supported at an angled orientation relative to the vertical axis V (FIG. 20). Referring to FIG. 20, the fourth sheave 174 is supported at an angle φ1 relative to the vertical axis V, and the third sheave 172 is supported at an angle φ2 relative to the vertical axis V. As described herein, the second sheave block 170 can be symmetrical relative to the vertical axis V and the angle φ1 can equal the angle φ2.

The second sheave block 170 includes plates for supporting the angularly-oriented sheaves 172, 174. For example, a first outside plate 176a and a first inside plate 178a can define a first slit or space 177a therebetween for receiving the third sheave 172. The third sheave 172 can be rotationally supported in the first space 177a by a first rotational mount assembly 188a. Referring still to FIGS. 18-20, the third sheave 172 can include a cable-receiving groove 173 that is dimensioned and structured to receive and guide the cable 142. Additionally, a second outside plate 176b and a second inside plate 178b can define a second slit or space 177b therebetween for receiving the fourth sheave 174. The fourth sheave 174 can be rotationally supported in the second space 177b by a second rotational mount assembly 188b. Referring still to FIGS. 18-20, the fourth sheave 174 can include a cable-receiving groove 175 that is dimensioned and structured to receive and guide the cable 142. In various instances, the rotational mount assemblies 188a, 188b can be accessible to an operator and/or technician, as described herein.

Referring primarily to FIG. 19, the first rotational mount assembly 188a and the second rotational mount assembly 188b can be aligned with coplanar axes A3 and A4. Stated differently, the third sheave 172 can be configured to rotate about the axis A3 and the fourth sheave 174 can be configured to rotate about the axis A4 which can be coplanar with the axis A3. The coplanar axes A3 and A4 can be angularly-oriented relative to each other. For example, the axis A3 can be oriented at an angle σ1 from the vertical axis V, and the axis A4 can be oriented at an angle σ2 from the vertical axis V. The angle σ1 can equal or substantially equal the angle σ2 such that the sheave block 170 is symmetrical relative to the vertical axis V.

Referring primarily still to FIG. 20, the second sheave block 170 includes lower rails 184a, 184b. As the sheave block 170 moves through the track 124 in the hoist frame 106, the lower rails 184a, 184 can guide and support the frame 171a, 171b of the second sheave block 170. The lower rails 184a, 184b can be releasably secured to the frame 171a, 171b by fasteners 189. In such instances, the rails 184a, 184b can be disassembled from the second sheave block 170. Additionally, the second sheave block 170 includes upper rails 186. As the sheave block 170 moves through the track 124 in the hoist frame 106, the upper rails 186 can guide and support the frame 171a, 171b of the second sheave block 170. The upper rails 186 can be releasably secured to the frame 171a, 171b by fasteners 189. In such instances, the rails 186 can be disassembled from the second sheave block 170.

As described herein, the second sheave block 170 can comprise a movable sheave block that is configured to translate along the longitudinal axis L through the track 124 in the hoist frame 106. The second sheave block 170 further includes a rod 194 protruding from the forward plate 180. The rod 194 can be integrally formed with the forward plate 180 and/or securely attached thereto. Moreover, the rod 194 can be connected to the piston 192 of the drive mechanism 190 by a locking pin 196. For example, the locking pin 196 can extend through an aperture in the rod 194 and an aperture in the piston 192 to secure the rod 194 to the piston 192. Moreover, the locking pin 196 can disengage the piston 192 to release the rod 194 from the piston 192.

The various components of the second sheave block 170 can facilitate disassembly of the second sheave block 170. For example, at least one fastener 189 can be removed to disengage a component of the second sheave block 170. In certain instances, the lower rails 184a, 184b and/or the upper rails 186 can be removed from the second sheave block 170. Additionally, the rotational mount assemblies 188a, 188b can be removed from the second sheave block 170. For example, the rotational mount assemblies 188a, 188b can be accessible through an opening 185 between the inner plates 178a and 178b and between the forward plate 180 and the rearward plate 182. For example, the rotational mount assemblies 188a, 188b can be accessible by a greasing device for lubricating the spool of the sheave 172, 174, respectively. Moreover, because the third axis A3 is not collinear with the fourth axis A4, the axes A3, A4 can be greased independently and the user can control how much grease is applied to each of the sheaves 172, 174.

Additionally, the rotational mount assemblies 188a, 188b can be disengagable from the second sheave block 170 to facilitate the removal of the sheaves 172, 174, respectively. In certain instances, it may be desirable to remove a sheave 172, 174 for cleaning, repair, and/or replacement. In particular, the sheaves 172, 174 can become worn over time and/or with repeated use. To avoid replacement of the entire sheave block 170, at least one sheave 172, 174 can be removed for service and/or replacement. The sheaves 172, 174 can be replaced independently, for example.

In certain instances, at least one upper rail 186 can be removed from the second sheave block 170 to enlarge the opening 185 and further improve access to the rotational mount assemblies 188a, 188b. In various instances, the frame 171 and/or various components thereof can be disassembled to further increase access to the rotational mount assemblies 188a, 188b. The sheaves 172, 174 can be removable and replaceable. For example, the depicted sheaves 172, 174 can be removed and replaced with replacement sheaves. The sheaves 172, 174 can slide out of the spaces 177a, 177b, respectively, when the rotational mount assemblies 188a, 188b, respectively, have been released from the second sheave block 170. For example, each sheave 172, 174 can comprise a sheave diameter that is less than the length of the space 177a, 177b, respectively. The reader will appreciate that replaceable sheaves can extend the lifespan of the second sheave block 170, which can reduce costs and increase value.

Figure 21:
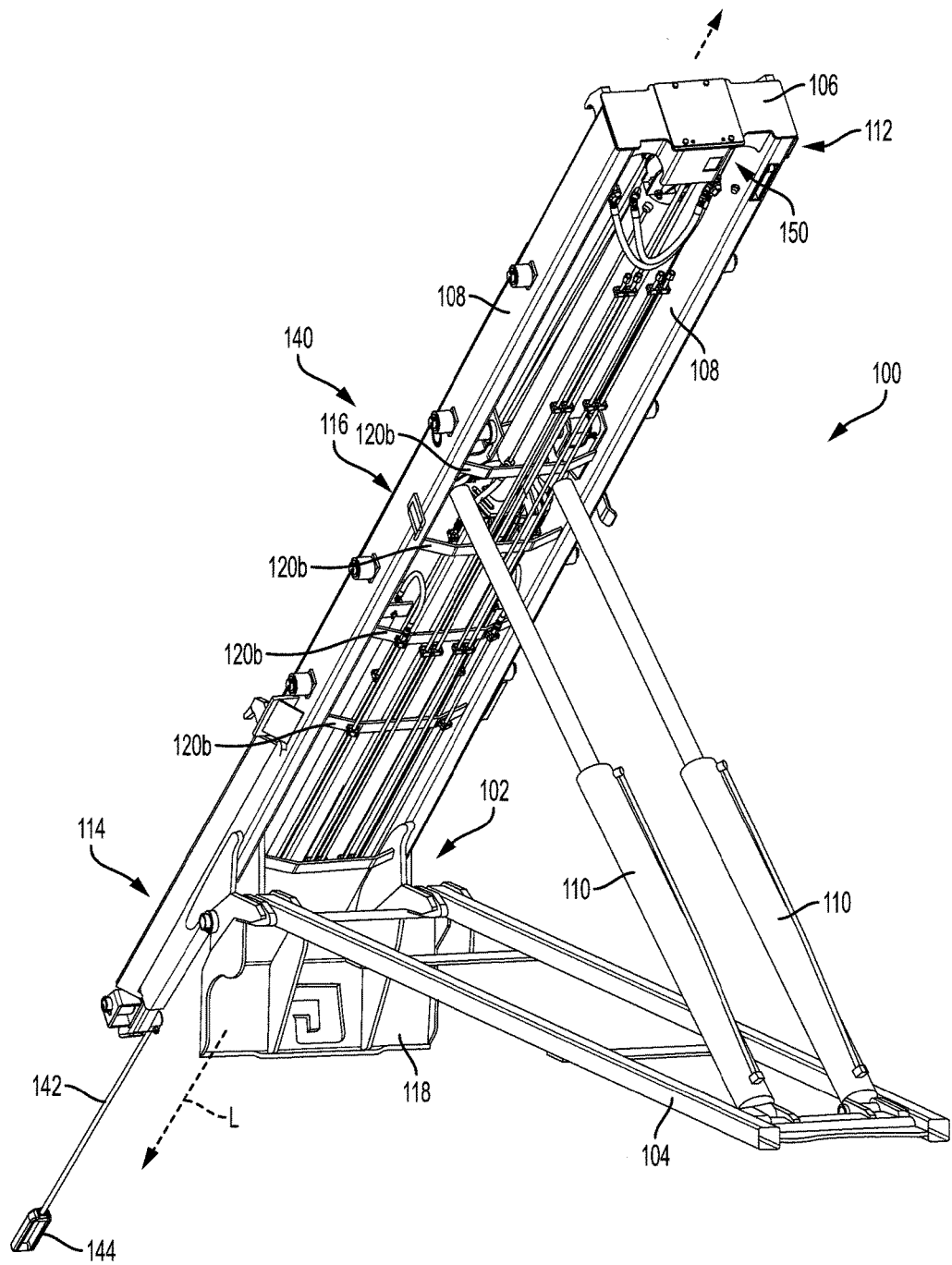
FIG. 21 is a perspective view of the hoist apparatus of FIG. 1, depicting the hoist apparatus in a lifted orientation, according to various embodiments of the present disclosure.
Figure 22:
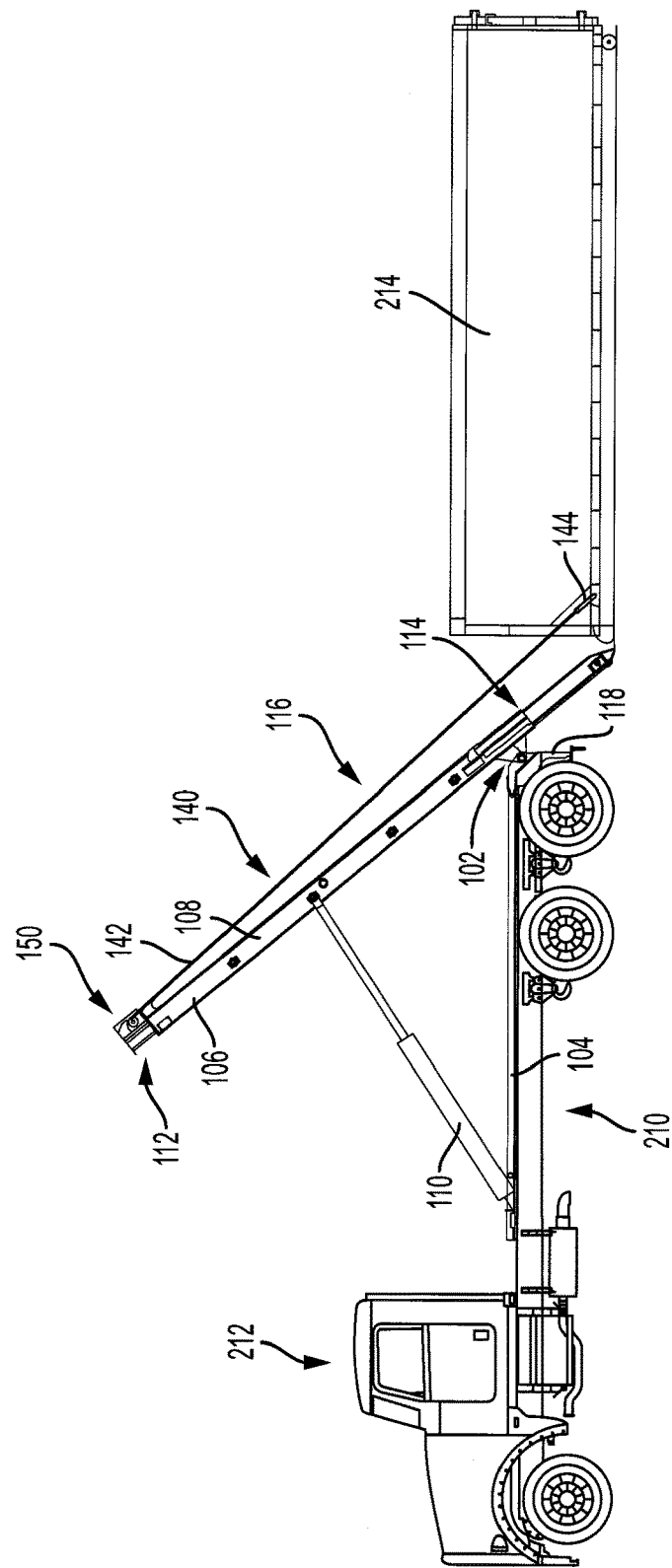
FIG. 22 is an elevation view of a vehicle having the hoist apparatus of FIG. 1 mounted thereto, depicting the hoist apparatus in the lifted orientation of FIG. 21, and further depicting a container engaged with the hoist apparatus and ready to load onto the hoist apparatus, according to various embodiments of the present disclosure.
Figure 23:
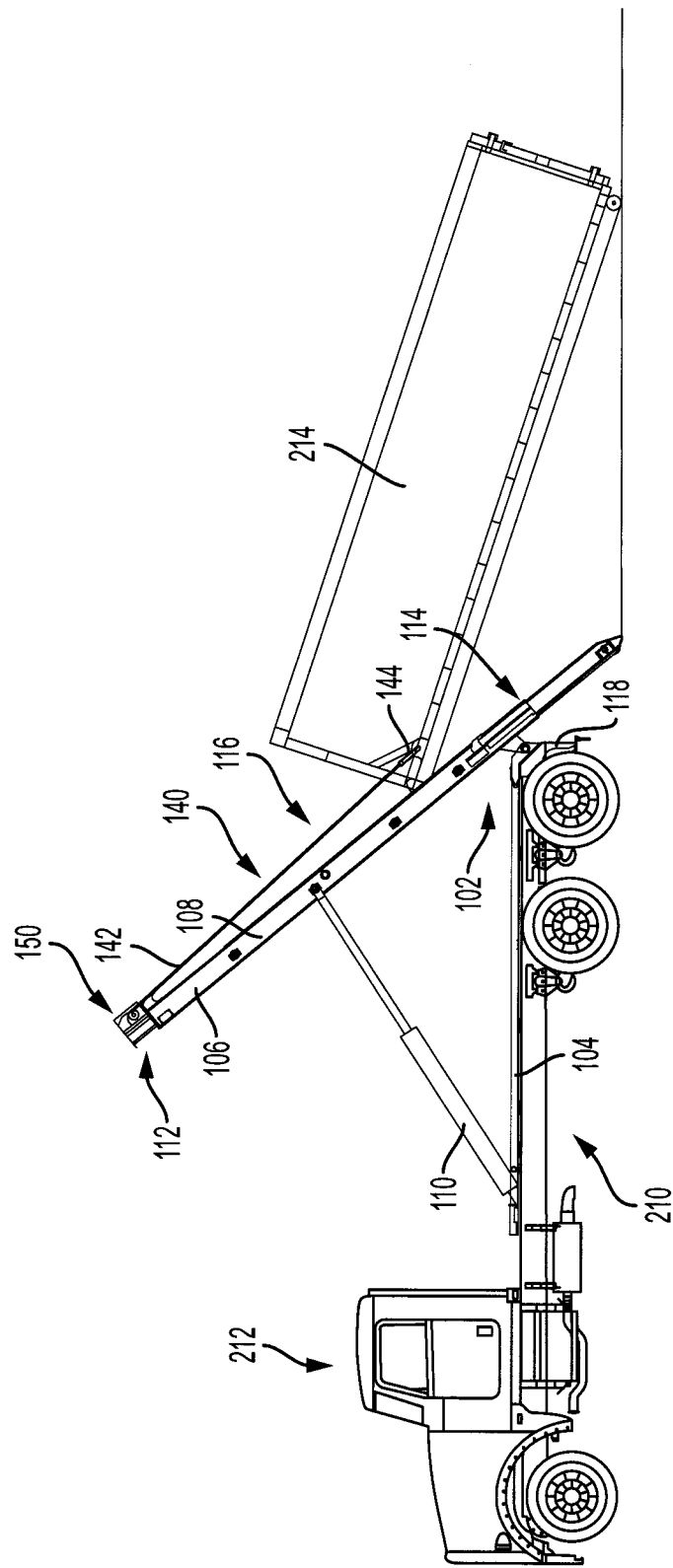
FIG. 23 is an elevation view of the vehicle and the hoist apparatus of FIG. 22, depicting the hoist apparatus in the lifted orientation, and further depicting the container engaged with the hoist apparatus and partially loaded onto the hoist apparatus, according to various embodiments of the present disclosure.

Referring now to FIG. 21, the hoist assembly 100 is depicted in the lifted orientation. As described herein, the hoist frame 106 can be pivoted relative to the stationary frame 104. For example, the hoist frame 106 can pivot at the joint 102 at the rearward portion 114 of the hoist frame 106. The drive system for lifting the hoist frame 106 can comprise a pair of hydraulic cylinders 110. When actuated, the pistons of the hydraulic cylinders 110 can extend to lift the hoist frame 106 away from the stationary frame 104.

The hydraulic cylinders 110 can be positioned between the longitudinal members 108 of the hoist frame 106. When in the lowered orientation (see, e.g., FIG. 1), the hydraulic cylinders 110 can rest on either side of the drive mechanism 190 and between the drive mechanism 190 and the longitudinal members 108 of the hoist frame 106. Inward placement of the hydraulic cylinders can provide a variety of benefits, including reduction of the overall width of the hoist apparatus 100. Additionally, additional features and/or equipment, such as fuel supplies, for example, can be mounted and/or positioned along the side(s) of the hoist frame 106. Another hoist apparatus having inwardly-positioned hydraulic cylinders is described in U.S. patent application Ser. No. 13/648,859, filed Oct. 10, 2012, entitled HOIST APPARATUS, now U.S. Patent Application Publication No. 2013/0089397, the disclosure of which is hereby incorporated by reference herein in its entirety.

Operation of the hoist assembly 100 is depicted in FIGS. 22-25. In use, the hoist apparatus 100 can be mounted to a trailer 210. In certain instances, the stationary frame 104 of the hoist apparatus 100 can be integrally formed with the trailer 210. In other instances, the stationary frame 104 can be welded, fastened, and/or otherwise secured to the trailer 210. The trailer 210 can comprise the trailer 210 of a vehicle 212. The vehicle depicted in FIGS. 22-25 is a semi-trailer truck; however, the reader will appreciate that the trailer can be formed with and/or hauled by a variety of different vehicles.

The hoist frame 106 can be lifted to the lifted orientation to facilitate loading and/or unloading of a container 214 onto the hoist apparatus 100. For example, referring primarily to FIG. 22, to load the container 214 onto the hoist apparatus 100, the hoist frame 106 can be lifted to the lifted orientation and the attachment portion 144 of the cable 142 can be secured to the container 214. After the container 214 is secured to the cable 142, the pulley system 140 can be activated. For example, the movable sheave block 170 can be driven from the intermediate portion 116 of the hoist frame 106 toward the rearward portion 114 of the hoist frame 106.

As the sheave block 170 moves through the track 124 in the hoist frame 106 toward the rearward portion 114, the length of cable extending between the first sheave block 150 at the forward portion 112 of the hoist frame 106 and the attachment portion 144 of the cable 142 can be shortened. As a result, referring primarily now to FIG. 23, the attachment portion 144 can be drawn toward the forward portion 112 of the hoist frame 106. Moreover, the pulley system 140 can pull the container 214 onto the hoist frame 106. For example, the container 214 can slide and/or roll up the ramped hoist frame 106. The container 214 may include at least one wheel to facilitate rolling. Additionally or alternatively, the container 214 can include rollers, rails, and/or skids. The reader will appreciate that the pulley system 140 described herein can be used with a variety of suitable containers.

Figure 24:
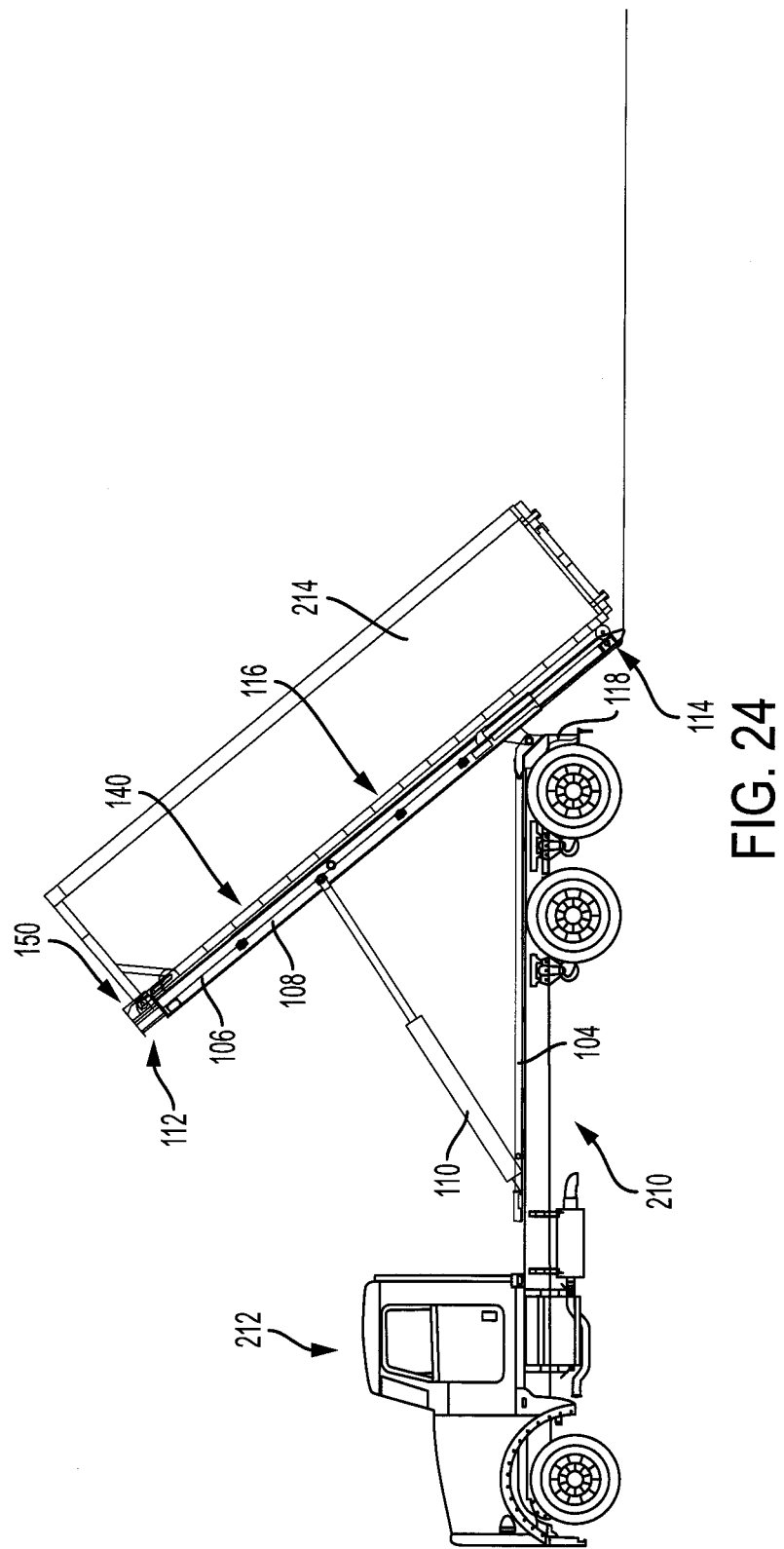
FIG. 24 is an elevation view of the vehicle and the hoist apparatus of FIG. 22, depicting the hoist apparatus in the lifted orientation, and further depicting the container engaged with the hoist apparatus and fully loaded onto the hoist apparatus, according to various embodiments of the present disclosure.

Referring now to FIG. 24, continued activation of the pulley system 140 can continue to draw the attachment portion 144 toward the forward portion 112 of the hoist frame 106, which can pull the container 214 further onto the hoist frame 106. When the container 214 is fully loaded on the hoist frame, the container can be locked to the hoist apparatus by at least one latch. A latching system is disclosed in U.S. patent application Ser. No. 14/493,618, entitled LATCH, filed Sep. 23, 2014, the disclosure of which is hereby incorporated by reference herein in its entirety.

Referring primarily now to FIG. 25, the hoist frame 106 can be lowered to the lowered orientation during transit of the vehicle 212 and the container 214 thereon. In certain instances, the hoist frame 106 can be lifted from the lowered orientation to facilitate dumping of the contents in the container 214. Additionally or alternatively, the hoist frame 106 can be lifted to facilitate unloading of the container 214 from the trailer 210. In such instances, the pulley system can be activated in a reverse direction such that the movable sheave block 170 is driven from the rearward portion 114 of the hoist frame 106 toward the intermediate portion 116 of the hoist frame 106. As the sheave block 170 moves through the track 124 in the hoist frame 106 toward the intermediate portion 116, the length of cable extending between the first sheave block 150 at the forward portion 112 of the hoist frame 106 and the attachment portion 144 of the cable 142 can be lengthened. As a result, the attachment portion 144 can be released away from the forward portion 112 of the hoist frame 106 and the container 214 can be released from the hoist frame 106.

While the present disclosure has been described as having certain designs, the various disclosed embodiments may be further modified within the scope of the disclosure. This application is therefore intended to cover any variations, uses, or adaptations of the disclosed embodiments using its general principles. Further, this application is intended to cover such departures from the present disclosure as come within known or customary practice in the relevant art.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A hoist assembly, comprising:
    a frame;
    a first sheave assembly fixed relative to the frame, wherein the first sheave assembly comprises:
        a first sheave comprising a first axis of rotation; and
        a second sheave comprising a second axis of rotation oriented perpendicular to the first axis of rotation;
    a second sheave assembly movable relative to the frame, wherein the second sheave assembly comprises:
        a third sheave comprising a third axis of rotation; and
        a fourth sheave comprising a fourth axis of rotation angularly-oriented relative to the third axis of rotation, wherein the third axis of rotation and the fourth axis of rotation are positioned in a plane; and
    a cable engaged with the first sheave, the second sheave, the third sheave, and the fourth sheave.

2. The hoist assembly of claim 1, wherein the second sheave assembly comprises a casing defining a first slit and a second slit angularly oriented relative to the first slit, wherein the third sheave is positioned in the first slit, and wherein the fourth sheave is positioned in the second slit.

3. The hoist assembly of claim 2, wherein the casing comprises a top, and wherein the first slit and the second slit are accessible from the top.

4. The hoist assembly of claim 2, wherein the first slit comprises a first access opening having a first length, and wherein the third sheave comprises a third diameter that is less than the first length.

5. The hoist assembly of claim 4, wherein the second slit comprises a second access opening having a second length, and wherein the fourth sheave comprises a fourth diameter that is less than the second length.

6. The hoist assembly of claim 1, wherein the cable extends from the first sheave to the third sheave, from the third sheave to the second sheave, and from the second sheave to the fourth sheave.

7. The hoist assembly of claim 6, wherein the first sheave is positioned forward of the second sheave.

8. The hoist assembly of claim 6, wherein the cable extends over the second sheave to the first sheave, and wherein the cable extends under the second sheave to the third sheave.

9. The hoist assembly of claim 6, further comprising a drive mechanism coupled to the frame and to the second sheave assembly, wherein the drive mechanism is aligned with an axis, and wherein the axis extends between the third sheave and the fourth sheave of the second sheave assembly.

10. The hoist assembly of claim 9, wherein the first axis of rotation is oriented perpendicular to the axis.

11. A hoist assembly, comprising:
a frame;
a first sheave assembly fixed relative to the frame, wherein the first sheave assembly comprises:
a first sheave; and
a second sheave;
a second sheave assembly movable relative to the frame along a longitudinal axis, wherein the second sheave assembly comprises:
a third sheave comprising a third axis of rotation; and
a fourth sheave comprising a fourth axis of rotation angularly-oriented relative to the third axis of rotation, wherein the third axis of rotation and the fourth axis of rotation are positioned in a plane, and wherein the longitudinal axis extends between the third axis of rotation and the fourth axis of rotation and is oriented perpendicular to the plane; and
a cable engaged with the first sheave, the second sheave, the third sheave, and the fourth sheave.

12. The hoist assembly of claim 11, further comprising a drive mechanism coupled to the frame and the second sheave assembly, wherein the drive mechanism is aligned with the longitudinal axis.

13. The hoist assembly of claim 12, wherein the drive mechanism comprises a hydraulic cylinder.

14. The hoist assembly of claim 11, wherein the cable extends from the first sheave to the third sheave, from the third sheave to the second sheave, and from the second sheave to the fourth sheave.

15. The hoist assembly of claim 11, wherein the first sheave comprises a first axis of rotation oriented perpendicular to the longitudinal axis, and wherein the second sheave comprises a second axis of rotation oriented perpendicular to the first axis of rotation and to the longitudinal axis.

16. A hoist assembly for hoisting an object onto a frame, comprising:
a first sheave assembly fixed relative to the frame, wherein the first sheave assembly comprises:
a first sheave; and
a second sheave;
a second sheave assembly movable relative to the frame, wherein the second sheave assembly comprises:
a casing comprising:
a first slot; and
a second slot angularly oriented relative to the first slot; and
a first replaceable sheave positioned in the first slot; and
a second replaceable sheave positioned in the second slot; and
a cable engaged with the first sheave, the second sheave, the first replaceable sheave, and the second replaceable sheave.

17. The hoist assembly of claim 16, wherein the first slot comprises a first access opening having a first length, and wherein the first replaceable sheave comprises a first diameter that is less than the first length.

18. The hoist assembly of claim 17, wherein the second slot comprises a second access opening having a second length, and wherein the second replaceable sheave comprises a second diameter that is less than the second length.

19. The hoist assembly of claim 18, wherein the casing further comprises:
a top, wherein the first access opening and the second access opening are accessible from the top; and
a central opening positioned intermediate the first access opening and the second access opening, wherein the central opening is accessible from the top.

20. The hoist assembly of claim 19, wherein the second sheave assembly comprises:
a first rotational mount coupled to the first replaceable sheave, wherein the first rotational mount is positioned within the central opening and; and
a second rotational mount coupled to second replaceable fourth sheave, wherein the second rotational mount is positioned within the central opening.

* * * * *